United States Patent
Yamanakajima

(10) Patent No.: US 12,177,228 B2
(45) Date of Patent: Dec. 24, 2024

(54) AUTHORIZATION SERVER, SYSTEM, AND METHOD FOR SYSTEM

(71) Applicant: CANON KABUSHIKI KAISHA, Tokyo (JP)

(72) Inventor: Kazunari Yamanakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 17/744,516

(22) Filed: May 13, 2022

(65) Prior Publication Data

US 2022/0272104 A1 Aug. 25, 2022

Related U.S. Application Data

(63) Continuation of application No. PCT/JP2020/041802, filed on Nov. 10, 2020.

(30) Foreign Application Priority Data

Nov. 19, 2019 (JP) .................. 2019-208994

(51) Int. Cl.
*H04L 9/40* (2022.01)

(52) U.S. Cl.
CPC ........ *H04L 63/108* (2013.01); *H04L 63/0807* (2013.01); *H04L 63/102* (2013.01)

(58) Field of Classification Search
CPC . H04L 63/108; H04L 63/0807; H04L 63/102; G06F 21/35; G06F 21/62
See application file for complete search history.

(56) References Cited

U.S. PATENT DOCUMENTS

| 6,978,367 | B1* | 12/2005 | Hind ................. H04L 63/20 |
| | | | 705/76 |
| 2002/0054080 | A1* | 5/2002 | Belanger ............ G06F 16/95 |
| | | | 707/E17.107 |
| 2016/0119301 | A1* | 4/2016 | Thilgen ........... H04L 41/0893 |
| | | | 726/1 |
| 2018/0375791 | A1* | 12/2018 | Kaladgi ............ H04L 47/821 |
| 2020/0233388 | A1* | 7/2020 | Pognant ........... H04L 67/125 |
| 2021/0036859 | A1* | 2/2021 | Sukhomlinov ..... H04L 9/3273 |

FOREIGN PATENT DOCUMENTS

| JP | 5623234 B2 | 11/2014 |
| JP | 2016535880 A | 11/2016 |
| JP | 2017037407 A | 2/2017 |

\* cited by examiner

*Primary Examiner* — Bruce S Ashley
(74) *Attorney, Agent, or Firm* — Canon U.S.A., Inc. IP Division

(57) ABSTRACT

After receiving an authorization result from a user, an authorization server sets a deadline for re-authorization, performs wait processing until the deadline, and thereafter issues an access token.

9 Claims, 19 Drawing Sheets

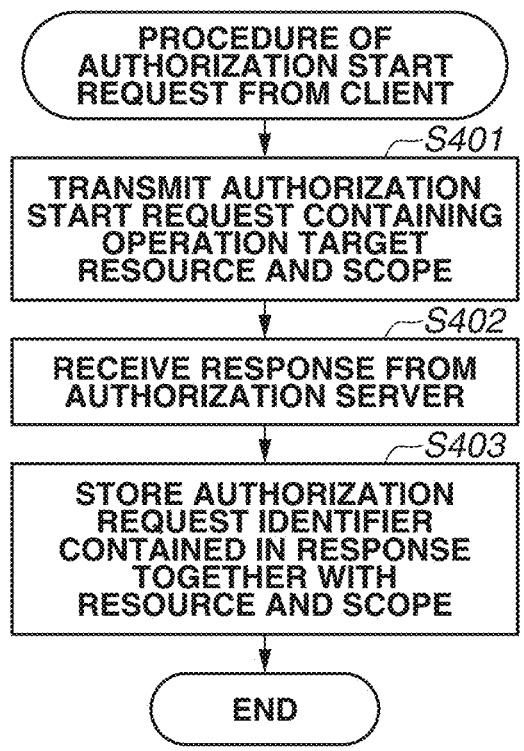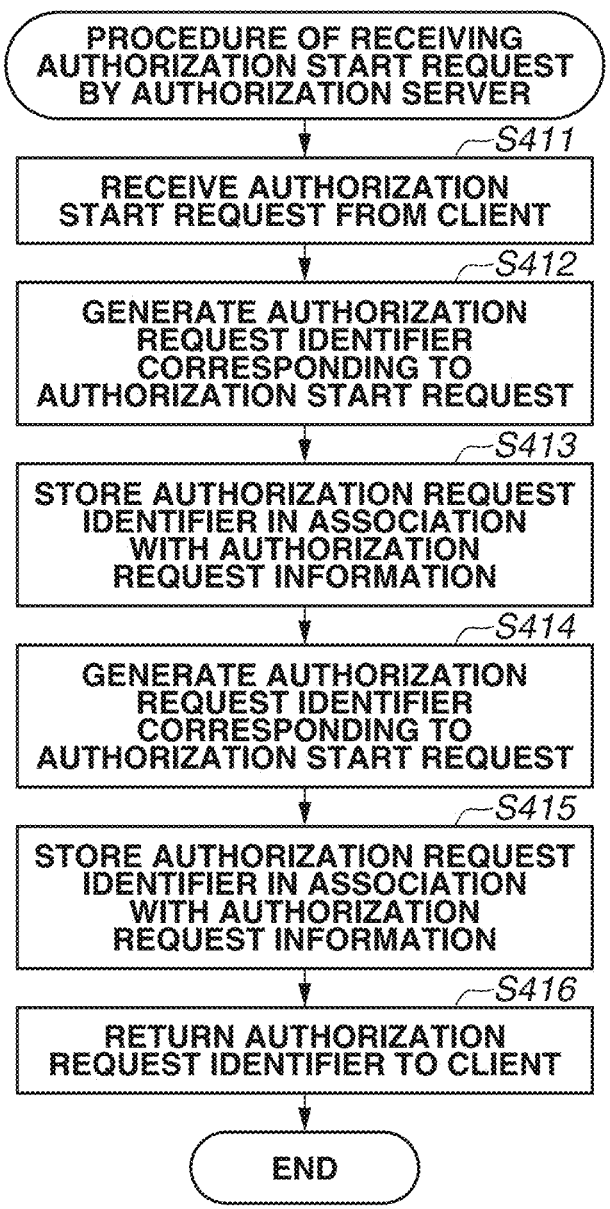

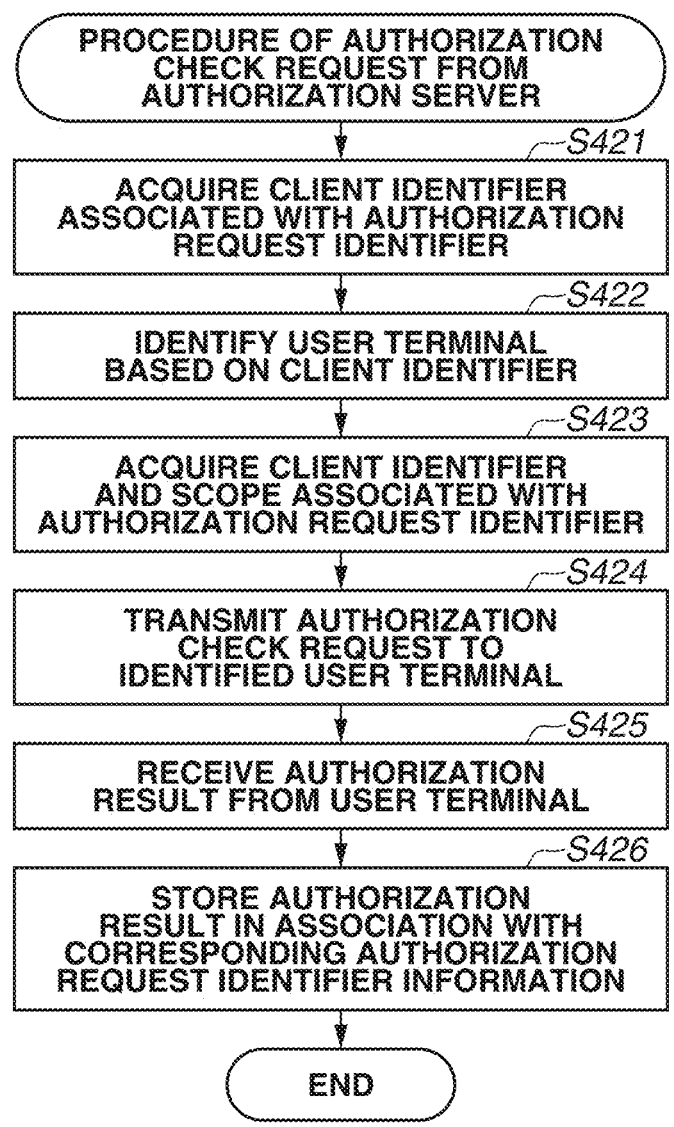

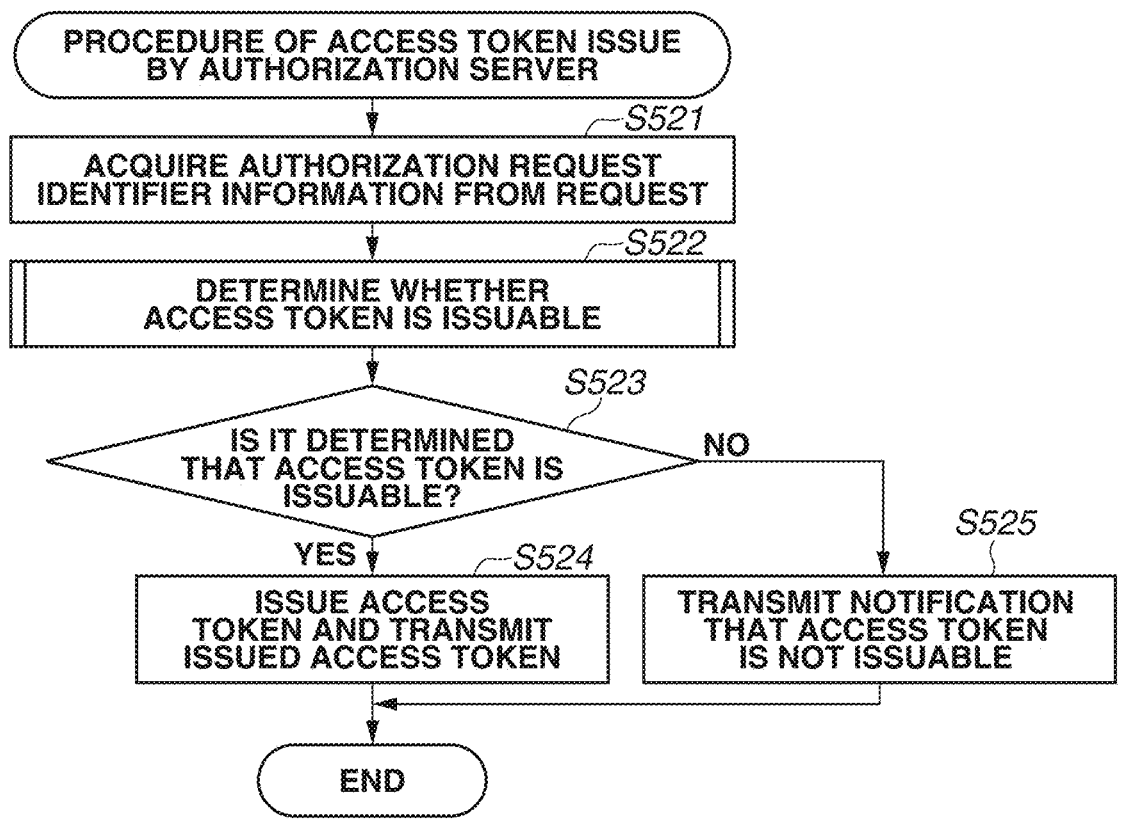
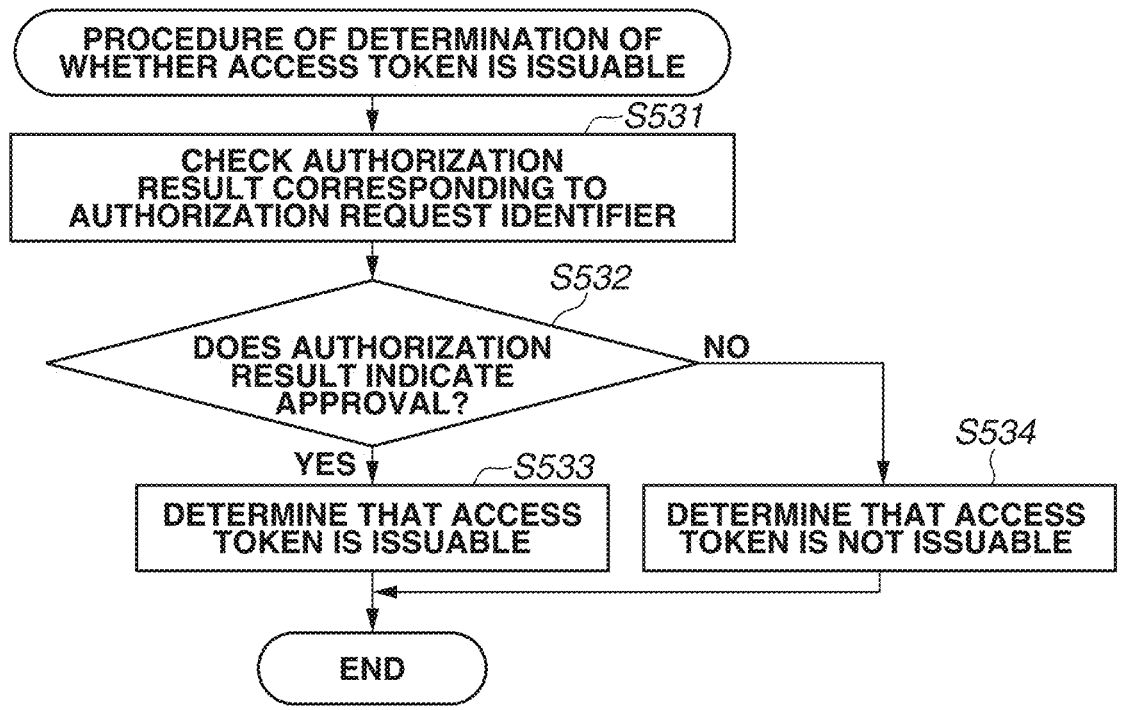

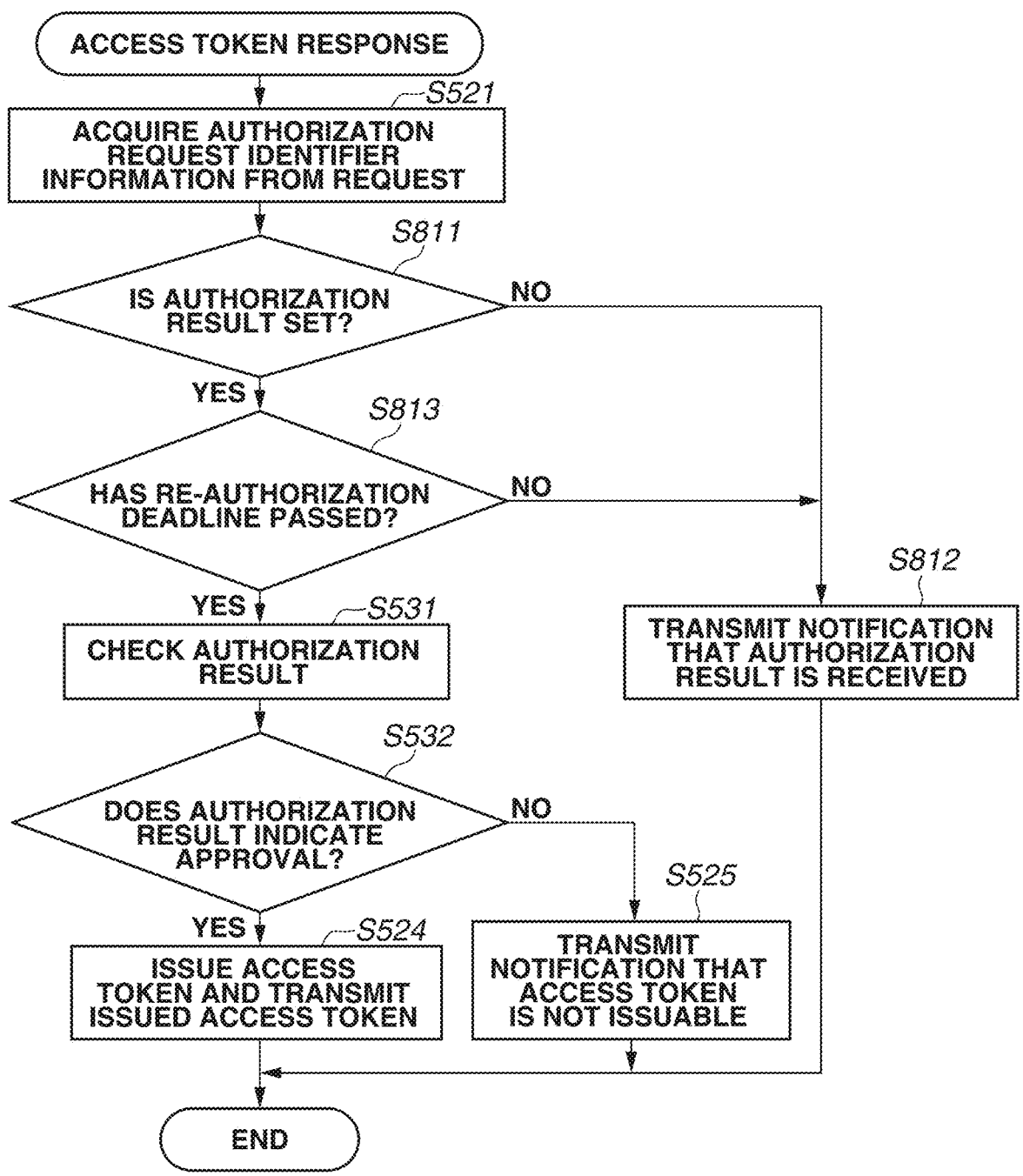

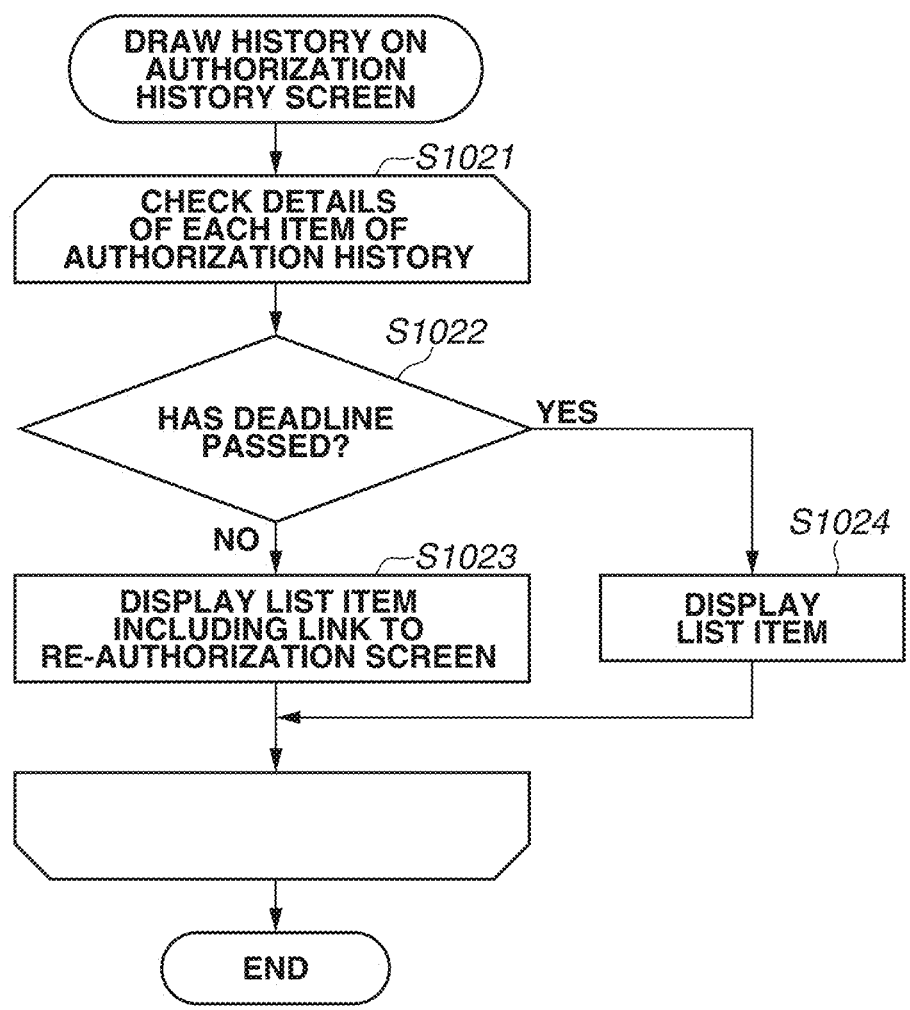

FIG.11

```
{
   "scope"="/datalake/iot0010/data/get-data",
   "hint"="user_A",
   "retry"=true,
   "expires_in"=1800
}
```

AUTHORIZATION SERVER, SYSTEM, AND METHOD FOR SYSTEM

CROSS-REFERENCE TO RELATED APPLICATIONS

This application is a Continuation of International Patent Application No. PCT/JP2020/041802, filed Nov. 10, 2020, which claims the benefit of Japanese Patent Application No. 2019-208994, filed Nov. 19, 2019, both of which are hereby incorporated by reference herein in their entirety.

BACKGROUND OF THE INVENTION

Field of the Invention

The present invention relates to an authorization server configured to issue an access token in a case where authority to access resources is delegated, a system, and a method for the system.

Background Art

Authority delegation systems using Open Authorization 2.0 (OAuth 2.0) are realized on web systems. Patent Document 1 (PTL 1) discusses a technique of authority delegation in which, in setting a system link, a user operates both a client and an authorization server using a web browser and performs an authorization operation to delegate authority of the user to the client. The client accesses a resource of the user using the delegated authority of the user, whereby the system link is established. In order to delegate the authority of the user to the client using OAuth 2.0, the user needs to access the client using the web browser.

CITATION LIST

Patent Literature

PTL 1. Japanese Patent No. 5623234

According to a conventional method, an authority delegation procedure is initiated in response to a user operation for delegating authority to a client. However, the growth of Internet of Things (IoT) devices and mobile terminals, such as smartphones, develops a possibility of a new form of authority delegation. Specifically, an authority delegation procedure is initiated in response to an autonomous request from the client for authority delegation, and an authorization operation by the user is performed in a state where the user is physically distant and/or remote from the system.

In the above described form of authority delegation, an authorization request from the client and an authorization operation by the user are independent of each other. Consequently, when the user wishes to correct a previously-performed authorization operation, the user may not be able to perform a re-authorization operation. The present invention is directed to providing a system in which a user can perform a re-authorization operation in a form where an authorization request from a client and an authorization operation by a user are independent of each other.

SUMMARY OF THE INVENTION

According to an aspect of the present invention, an authorization server in a system including a resource server configured to provide a resource of a user, a client configured to access the resource, the authorization server configured to issue an access token indicating approval by the user for access of the client to the resource, and a user terminal, the authorization server includes a reception unit configured to receive an authorization start request from the client, an identification unit configured to identify, in a case where the authorization start request is received by the reception unit, the user terminal that is a transmission destination of an authorization check request, an authorization unit configured to transmit the authorization check request to the identified user terminal, receive an authorization check result as a response, and temporarily store the authorization check result for a time period during which re-authorization is allowed, and an issuance unit configured to control, in response to expiration of the period during which re-authorization is allowed, issuance of the access token based on the authorization check result stored temporarily, and transmit, in a case where the issuance unit issues the access token, the access token to the client from which the authorization start request has been transmitted.

Further features of the present invention will become apparent from the following description of exemplary embodiments with reference to the attached drawings.

BRIEF DESCRIPTION OF THE DRAWINGS

FIG. 4A is a flowchart illustrating a procedure of an authorization start request.

FIG. 4B is a flowchart illustrating the procedure relating to the authorization start request.

FIG. 4C is a flowchart illustrating a procedure of an authorization check request.

FIG. 5C is a flowchart illustrating an access token issuance procedure.

FIG. 5D is a flowchart illustrating a procedure relating to the access token issuance procedure.

FIG. 8B is a flowchart illustrating a procedure of an access token response.

FIG. 10B is a flowchart illustrating a procedure relating to the authorization history screen.

FIG. 11 is a diagram illustrating information that is transmitted in an authorization start request according to a second exemplary embodiment.

DESCRIPTION OF THE EMBODIMENTS

Figure 1:
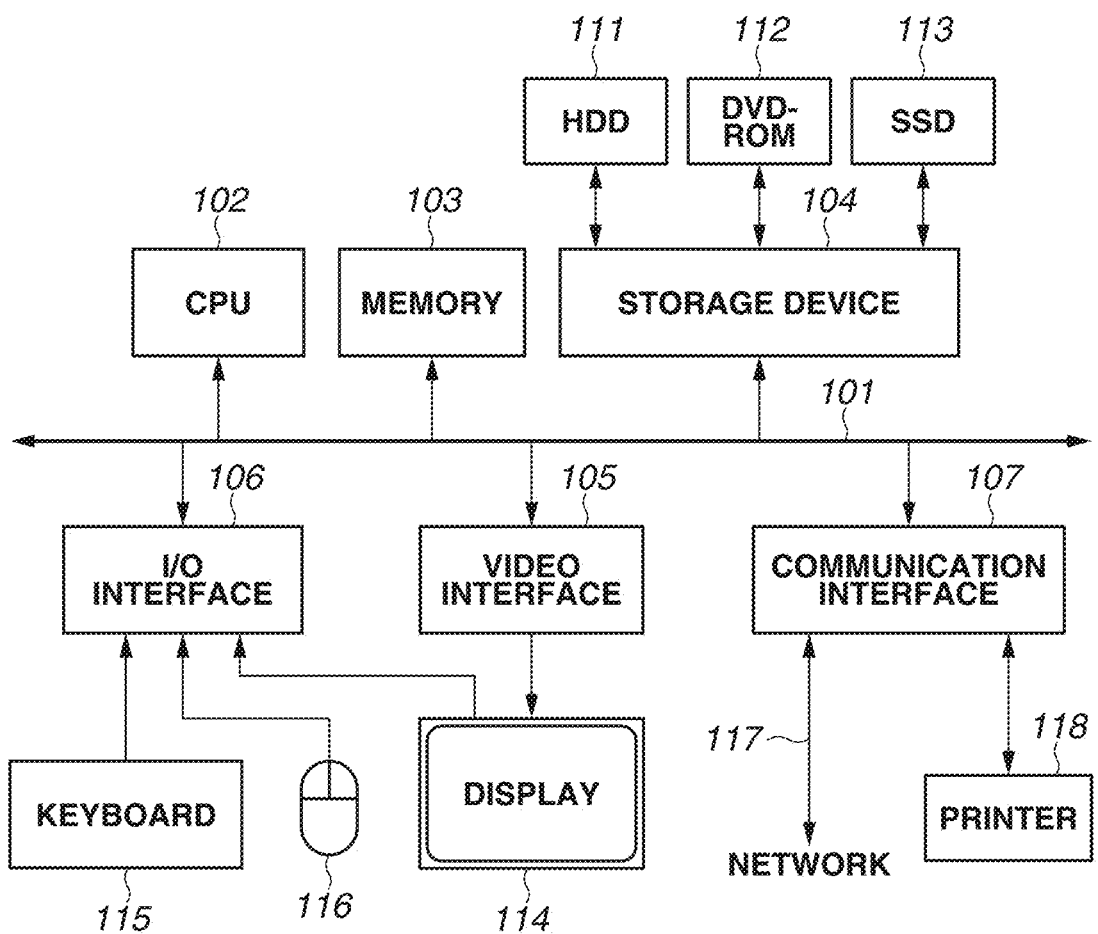
FIG. 1 is a diagram illustrating a configuration of an information processing apparatus.

Various exemplary embodiments of the present invention will be described below with reference to the drawings. FIG. 1 is a diagram illustrating a configuration of an information processing apparatus according to a first exemplary embodiment of the present invention. In FIG. 1, the information processing apparatus includes a central processing unit (CPU) 102, a memory 103, a storage device 104, a video interface 105, an input/output (I/O) interface 106, and a communication interface 107. The components of the information processing apparatus are connected together via a system bus 101. The CPU 102 controls the components via the system bus 101, calculates data, and processes data. The memory 103 is a device that stores data and programs, and includes a random access memory (RAM) and/or a read-only memory (ROM).

The storage device 104 writes and reads stored data. The storage device 104 includes a hard disk drive (HDD) 111, a digital versatile disk (DVD) ROM (DVD-ROM) 112 used as a non-volatile data source, and a solid state drive (SSD) 113 using a semiconductor memory. Although not illustrated in FIG. 1, a magnetic tape drive, a Floppy® disk drive (FDD), a compact disk (CD) ROM (CD-ROM) drive, a CD/DVD-RAM drive, and/or a universal serial bus (USB) flash drive may also be used as the storage device 104.

A program according to the present exemplary embodiment is read from the storage device 104 and stored in the memory 103, and the CPU 102 executes the stored program. While programs are read from the storage device 104 according to the present exemplary embodiment, programs can be read from a ROM (not illustrated) or can be read externally via the communication interface 107.

The video interface 105 controls display output to a display 114. The display 114 uses a cathode ray tube (CRT) or a liquid crystal method. The I/O interface 106 is connected to input devices such as a keyboard 115 and a pointing device 116. An operator issues operation instructions to the information processing apparatus by operating the keyboard 115. The pointing device 116 is used to move a cursor on the display 114 to select a menu or an object or to perform an operation. The display 114 may be configured to receive operation input via a touch panel. In this case, the display 114 serves as both an output device and an input device.

The communication interface 107 communicates with external devices via a computer network 117. Examples of connection destination networks include local area networks (LANs), wide area networks (WANs), and public lines, such as the Internet, and the connection destination can be wired networks and wireless networks. The communication interface 107 also communicates with other devices, such as a printer 118 locally connected to the communication interface 107.

Figure 2:
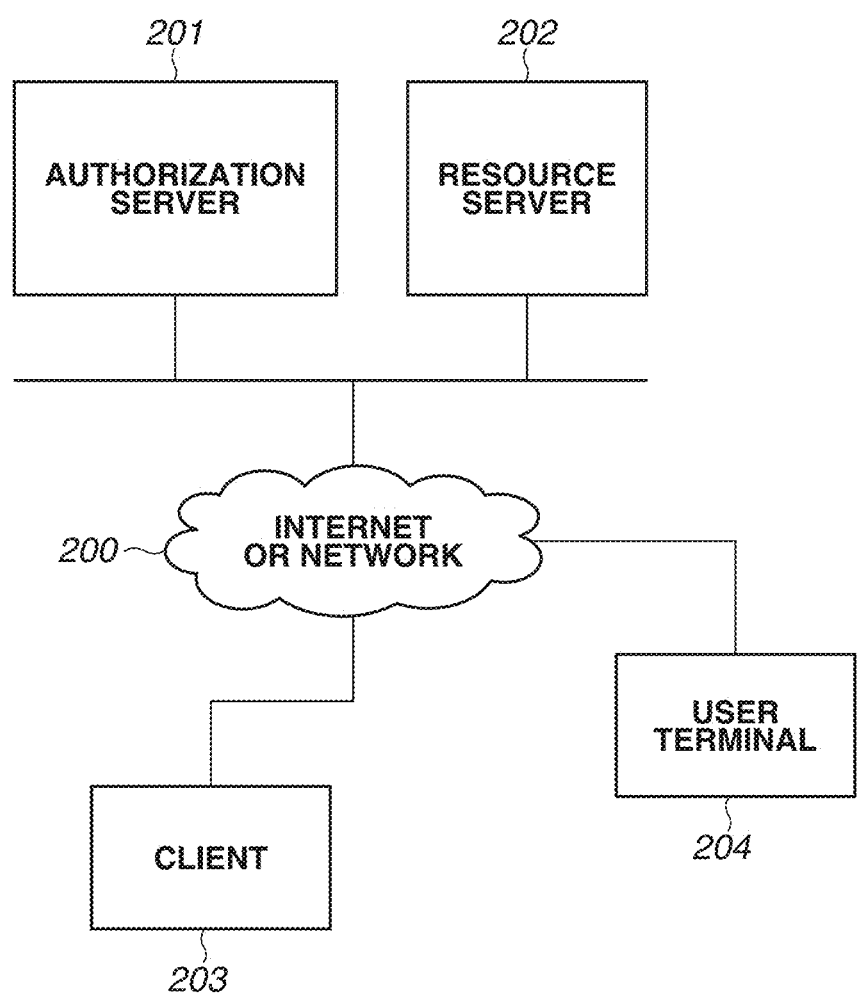
FIG. 2 is a diagram illustrating a network configuration of an authority delegation system.

FIG. 2 is a diagram illustrating a network configuration of an authority delegation system according to the present exemplary embodiment. Servers, a client, and a user terminal in FIG. 2 each have the apparatus configuration illustrated in FIG. 1. It should be noted that the configuration illustrated in FIG. 1 is not intended as a limitation and that other functions can be included or a rackmount system not limited to a single computer can be employed. Hereinafter, unless otherwise specified, an executor of servers and clients is the CPU 102, and an executor of software is a program stored in the storage device 104.

In FIG. 2, an authorization server 201, a resource server 202, a client 203, and a user terminal 204 are connected to a computer network 200. Examples of forms of the user terminal 204 include mobile computers, such as smartphone and tablet terminals and client personal computers. The computer network 200 can be a LAN, a WAN, or the Internet and can be a wired network or a wireless network.

According to the present exemplary embodiment, the user terminal 204 communicates with the authorization server 201 via the computer network 200, and the client 203 communicates with the authorization server 201 and the resource server 202 via the computer network 200. In a case where the user terminal 204 receives data, the user terminal 204 displays data acquired by a web browser or a dedicated client application on the display 114 of a client terminal.

FIGS. 3A to 3D are functional block diagrams illustrating an authority delegation system according to the present exemplary embodiment. FIGS. 3A, 3B, 3C, and 3D illustrate functional blocks of the client 203, the authorization server 201, the resource server 202, and the user terminal 204, respectively. The client 203 includes an authorization start request issuance unit 331, an access token request unit 333, an access token management unit 334, and a resource access unit 332. The authorization server 201 includes an authorization request management unit 311, an authorization check request transmission destination resolution unit 312, an authorization check unit 313, and an access token issuance unit 314. The resource server 202 includes a resource management unit 321. The user terminal 204 includes an authorization operation reception unit 341, an authorization result transmission unit 342, an authorization history management unit 343, and a screen display unit 344.

The authorization request management unit 311 of the authorization server 201 processes an authorization start request based on a request from the authorization start request issuance unit 331 of the client 203. The authorization start request contains resource information about a resource that the client 203 intends to access, a type of processing to be performed on the resource, client information, and the like. The authorization check request transmission destination resolution unit 312 determines a user terminal as a transmission destination of an authorization check request, based on the resource information, the processing type, the client information, and the like, that are contained in the authorization start request. The authorization check unit 313 transmits the authorization check request to the user terminal, here the user terminal 204, which is determined by the authorization check request transmission destination resolution unit 312. In a case where a user of the user terminal 204 performs an authorization operation, the client 203 becomes capable of acquiring an access token from the authorization server 201 and can access the resource server 202 using the access token.

Similar to the case using OAuth 2.0, the client 203 needs to be registered in the authorization server 201 before a procedure based on a protocol according to the first exemplary embodiment is initiated. To register the client 203 in the authorization server 201, the authorization server 201 provides a Hypertext Markup Language (HTML) registration form (not illustrated) involving interactions with a registrant of the client 203. Direct communication between the client 203 and the authorization server 201 is not essential in the registration of the client 203 according to the present exemplary embodiment. For example, the client 203 can be registered in the authorization server 201 using an assertion issued by the client 203 or a third party, or can be registered in the authorization server 201 by discovery of the client 203 using a secure channel by the authorization server 201.

In the registration of the client 203 in the authorization server 201 according to the first exemplary embodiment, the registrant of the client 203 designates a client type ("Confidential" defined in OAuth 2.0), an application name, a service name, a logo image, and a use rule. Further, in the registration, the authorization server 201 issues a client identifier and a client secret to the client 203. The client 203 stores the issued client identifier and the issued client secret in the authorization start request issuance unit 331.

Further, the authorization server 201 registers information received from the client 203 in a client registration table (Table 1) that is stored in the authorization check request transmission destination resolution unit 312.

TABLE 1

Client Registration Table

| Client Identifier | Client Secret | Application Name | Service Name | Logo Image | Use Rule |
|---|---|---|---|---|---|
| Client_1 | XXXXXXX | App_1 | Serv_1 | Logo.png | Yyyyyyy |

Further, the user terminal 204 needs to be registered in the authorization server 201 before the procedure according to the first exemplary embodiment is initiated. To register the user terminal 204 in the authorization server 201, the authorization server 201 provides a HTML registration form (not illustrated) involving interactions with a registrant of the user terminal 204.

Direct communication between the user terminal 204 and the authorization server 201 is not essential in the registration of the user terminal 204 according to the first exemplary embodiment. For example, the user terminal 204 can be registered using an assertion issued by the user terminal 204 or can be registered by discovery of the user terminal 204 using a secure channel by the authorization server 201. A plurality of user terminals can be registered.

In the registration, the authorization server 201 issues a terminal identifier (terminal ID) and a terminal secret to the user terminal 204. The client 203 stores the issued terminal ID and the issued terminal secret in the authorization operation reception unit 341. In the registration of the user terminal 204 in the authorization server 201 according to the first exemplary embodiment, the registrant of the user terminal 204 designates information including user terminal information (an authorization check request notification communication endpoint described below), the service name and the application name (that are designated in the registration of the client 203), and a user identifier (username).

Figure 3A:
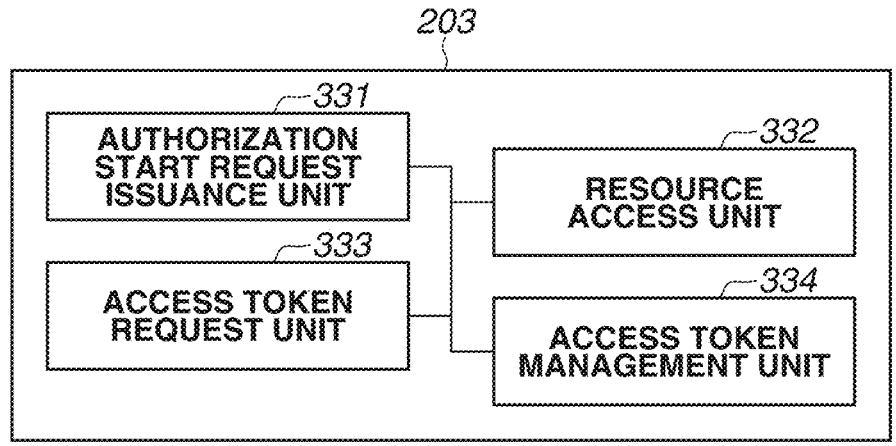
FIG. 3A is a functional block diagram illustrating a client.
Figure 3B:
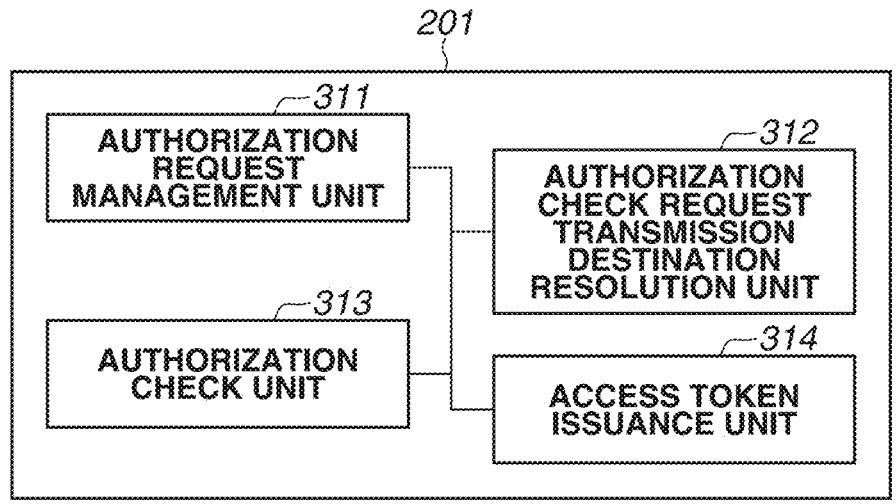
FIG. 3B is a functional block diagram illustrating an authorization server.
Figure 3C:
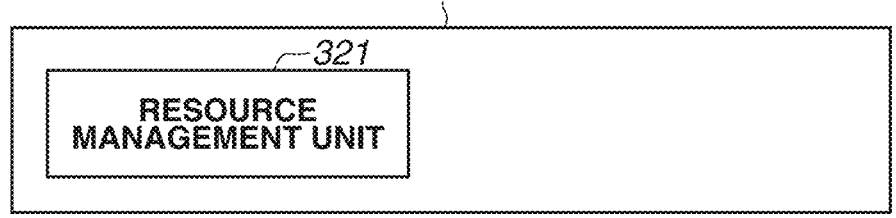
FIG. 3C is a functional block diagram illustrating a resource server.
Figure 3D:
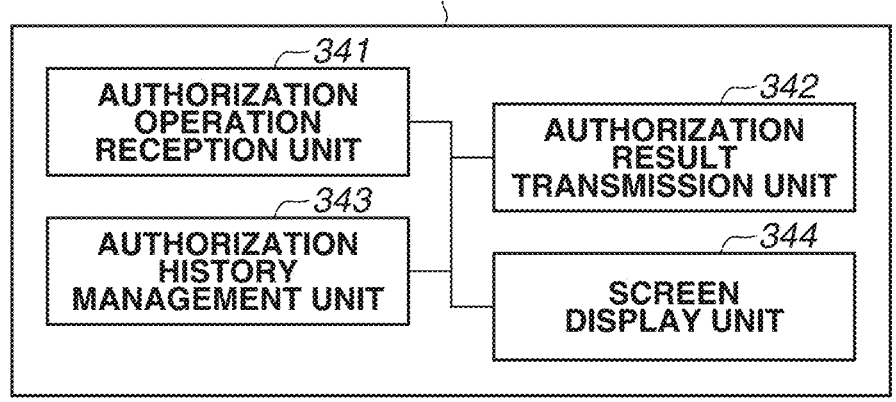
FIG. 3D is a functional block diagram illustrating a user terminal.

In the registration of the user terminal 204, the registered information is registered in a user terminal registration table (Table 2) stored in the authorization check request transmission destination resolution unit 312 of the authorization server 201 illustrated in FIG. 3B.

TABLE 2

User Terminal Registration Table

| User Terminal Information | Terminal ID | Terminal Secret | Client Identifier | Application Name | Service Name | User Identifier |
|---|---|---|---|---|---|---|
| 192.168.0.1 | Device_1 | wwwwww | Client_1 | App_1 | Serv_1 | user_A |
| 192.168.0.2 | Device_2 | zzzzzzzz | Client_1 | App_1 | Serv_1 | user_B |

According to the first exemplary embodiment, the information about the user terminal 204 is the user terminal information "192.168.0.1", a terminal ID "Device_1", a terminal secret "wwwwww", a client identifier "Client_1", an application name "App_1", a service name "Serv_1", and a user identifier "user_A". In Table 2, user terminal information "192.168.0.2", a terminal ID "Device_2", a terminal secret "zzzzzzzz", a client identifier "Client_1", an application name "App_1", a service name "Serv_1", and a user identifier "user_B" about another user terminal are also registered.

FIG. 4A is a flowchart of an authorization start request from the client 203 to the authorization server 201. The procedure is initiated in a case where an access token is necessitated before the client 203 accesses a resource on the resource server 202.

In step S401, the authorization start request issuance unit 331 transmits an authorization start request containing the client identifier, an operation target resource identifier, a scope, and hint information for identifying a target user to the authorization server 201. Details of the terms are as follows. The term "scope" refers to an access range of a resource. For example, in a case where data as a resource is to be acquired, "get-data" is designated, and in a case where access for editing or the like other than acquiring is to be performed, "get-all" is designated. The term "hint information for identifying a target user" refers to a user identifier. Further, the hint information can be identification (ID) token information issued previously to the user, email address information about the user, or user identifier information.

In step S402, the authorization start request issuance unit 331 receives a response from the authorization server 201. The response contains an authorization request identifier issued by the authorization server 201. In step S403, the authorization start request issuance unit 331 stores the authorization request identifier contained in the response received in step S402 together with the operation target resource and the scope identified in step S401, and the procedure ends.

Table 3 illustrates an example of an authorization request management table stored in the client 203.

TABLE 3

Authorization Request Management Table

| Authorization Request Identifier | Resource Identifier | Scope | Access Token Identifier |
|---|---|---|---|
| auth_req_id_12345 | /datalake/iot0010/data | get-data | (blank) |
| auth_req_id_98765 | /datalake/iot0011/data | get-data | actk111222333 |

In Table 3, an authorization start request performed with the scope "get-data" is stored in association with the authorization request identifier "auth_req_id_12345" for a resource identified by the resource identifier "/datalakeiiot0010/data". Table 3 also shows that the access token "actk111222333" is acquired for the authorization request identifier "auth_req_id_98765". A resource identified by a resource identifier can specify a single file on a file system or a specific record on a database. Alternatively, a set thereof can be specified.

FIG. 4B illustrates a flowchart of receiving an authorization start request by the authorization server 201. The procedure is initiated in a case where the authorization server 201 receives an authorization start request from the client 203.

In step S411, the authorization request management unit 311 receives an authorization start request from the client 203. The authorization start request contains the client identifier of the client 203, a resource identifier of an operation target of the client 203, a scope requested by the client 203, and hint information requested by the client 203.

In step S412, the authorization request management unit 311 generates an authorization request identifier corresponding to the authorization start request received in step S411. In step S413, the authorization request management unit 311 stores the authorization request identifier generated in step S412 in association with authorization request information. The authorization request information includes the client identifier, the resource identifier of the operation target, the scope, and the hint information that are received in step S411.

Table 4 illustrates an example of an authorization check status management table stored in the authorization request management unit 311.

TABLE 4

Authorization Check Status Management Table

| Authorization Request Identifier | Client Identifier | Resource | Scope | Hint Information | Authorization Result |
|---|---|---|---|---|---|
| auth_req_id_12345 | Client_1 | /datalake/iot0010/data | get-data | user_A | (blank) |
| auth_req_id_98765 | Client_1 | /datalake/iot0011/data | get-data | user_B | approved |
| auth_req_id_44444 | Client_2 | /datalake/iot0011/data | get-all | user_abcde | disapproved |

In Table 4, an authorization start request from a client specified by the client identifier "Client_1" to a resource specified by the resource identifier "/datalake/iot0010/data" with the scope "get-data" is stored in association with the authorization request identifier "auth_req_id_12345". Further, the authorization request identifier "auth_req_id_12345" is associated with the user identifier "user_A" as hint information about that a resource owner of the resource "/datalake/iot0010/data" is the user identifier "user_A". The authorization result indicated as "(blank)" corresponds to a state where, the user has not performed an authorization operation to the authorization request identifier "auth_req_id_12345". On the other hand, an authorization result corresponding to the authorization request identifier "auth_req_id_98765" is "approved", and an authorization result corresponding to the authorization request identifier "auth_req_id_44444" is "disapproved". The former is an authorization check result showing that the authorization has been approved by the user, and the latter is an authorization check result showing that the authorization has disapproved by the user. In step S416, the authorization request management unit 311 returns the authorization request identifier generated in step S414 to the client 203 as a response to step S411, and the procedure ends.

FIG. 4C is a flowchart of performing an authorization check request by the authorization server 201. The procedure is initiated in a case where authorization request information is stored in step S413. In step S421, the authorization check unit 313 acquires a client identifier associated with the authorization request identifier stored in step S413.

In a case where the authorization request identifier stored in step S413 is "auth_req_id_12345", the associated client identifier is "Client_1", and the associated hint information is "user_A". In step S422, the authorization check unit 313 identifies a user terminal to which an authorization check request is to be transmitted based on the client identifier acquired in step S421 and the hint information. For example, the authorization check unit 313 identifies the user terminal 204 from the user terminal registration table of Table 2 held in the authorization check request transmission destination resolution unit 312 as the user terminal associated with the client identifier "Client 1" and the hint information "user_A". Accordingly, it is also identified that an authorization check request notification communication endpoint is "192.168.0.1".

In step S423, the authorization check unit 313 acquires a client identifier and a scope that are associated with the authorization request identifier stored in step S413. In a case where the authorization request identifier stored in step S413 is "auth_req_id_12345", the associated client identifier and the associated scope are "Client_1" and "get-data", respectively.

In step S424, the authorization check unit 313 transmits an authorization check request containing the client identifier and the scope that are acquired in step S423 to the user terminal 204 identified in step S422. Examples of communication methods of the authorization check request transmission include a communication method using designation of an endpoint of the user terminal 204, a method using a push notification such as Message Queue Telemetry Transport (MQTT), and any other methods. According to the present exemplary embodiment, a direct communication method using designation of an authorization endpoint is used. The screen display unit 344 of the user terminal 204 displays an authorization check screen as illustrated in FIG. 9B described below and prompts the user of the user terminal 204 to provide authorization.

In step S425, the authorization check unit 313 receives an authorization result from the user terminal 204 as a response to the authorization check request transmitted in step S424. In step S426, the authorization check unit 313 stores the authorization result received in step S425 in association with the authorization request identifier stored in step S415, and the flow ends. In Table 4, the authorization result "approved" indicating successful approval of authorization is stored in association with the authorization request identifier "auth_req_id_98765". A description has been given of the procedure from an authority delegation request performed from the client 203 to an authorization operation performed by the user. Differences from OAuth 2.0 are that the client 203 autonomously transmits the authorization request without a user instruction and that the user performing the authorization operation does not intend to operate the client 203 and only decides whether to perform an authorization operation.

Figure 5A:
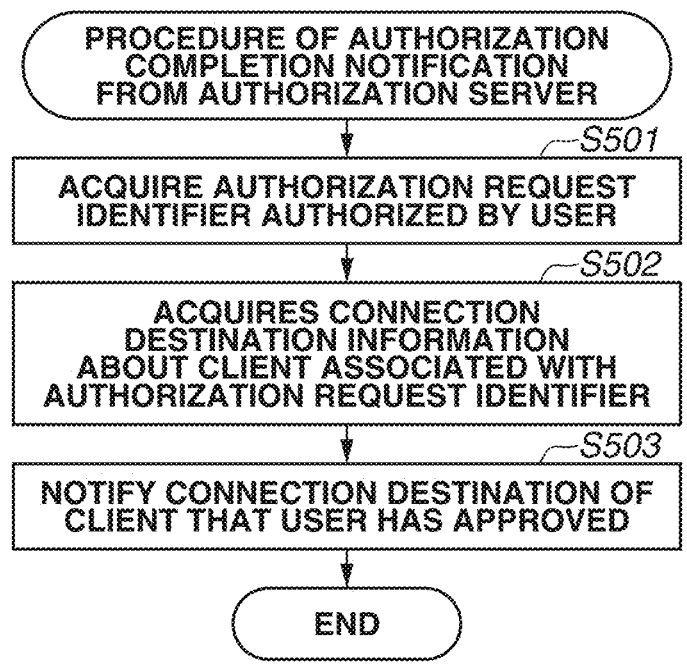
FIG. 5A is a flowchart illustrating an authorization completion notification procedure.

FIG. 5A is a flowchart of authorization completion notification that is performed by the authorization server 201 to the client 203, according to the present exemplary embodiment. The procedure is initiated after an authorization result is stored in step S426. In step S501, the authorization check unit 313 acquires the authorization request identifier stored in step S426. In step S502, the authorization check unit 313 acquires a client endpoint that is connection destination information about a client associated with the authorization request identifier acquired in step S501.

Table 5 illustrates a client management table that manages correspondences between client identifiers and client endpoints.

TABLE 5

Client Management Table

| Client Identifier | Client Endpoint |
|---|---|
| Client_1 | 10.0.0.1 |
| Client_2 | 10.0.1.1 |
| Client_3 | 10.0.2.1 |

According to Table 5, a client endpoint corresponding to the client identifier "Client_1" is "10.0.0.1". In step S503, the authorization check unit 313 notifies the client endpoint acquired in step S502 that the user has approved, and the procedure ends. The content of the notification to the client endpoint can be the authorization request identifier acquired in step S501 or can be an access token issued based on the authorization by the user. In a case where an access token is issued, a procedure as illustrated in FIG. 5C described below is performed.

Figure 5B:
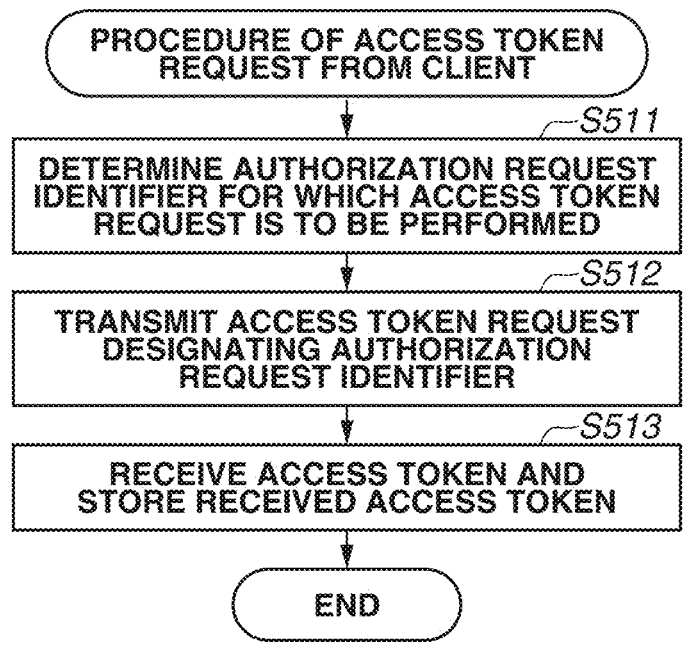
FIG. 5B is a flowchart illustrating an access token request transmission procedure.

FIG. 5B is a flowchart of transmitting an access token request from the client 203 to the authorization server 201 according to the present exemplary embodiment. The procedure is initiated in a case where the client 203 receives an authorization completion notification from the authorization server 201 in step S503. Alternatively, the procedure can be performed periodically by the client 203.

In step S511, the access token request unit 333 determines an authorization request identifier for which an access token request is to be performed. In a case where the procedure is performed periodically, an authorization request identifier is selected from those for which an access token has not been acquired, in the authorization request management table illustrated in Table 3. On the other hand, in a case where the procedure is initiated in response to a notification from the authorization server 201, the authorization request identifier contained in the notification from the authorization server 201 is used. In step S512, the access token request unit 333 transmits an access token request designating the authorization request identifier determined in step S51, to the authorization server 201. In step S513, the access token management unit 334 stores an access token received as a response to the request transmitted in step S512, and the procedure ends. In Table 3, the access token "actk111222333" acquired for the authorization request identifier "auth_req_id_98765" is stored.

FIG. 5C is a flowchart of issuing an access token by the authorization server 201 according to the present exemplary embodiment. The procedure is initiated in a case where the authorization server 201 receives an access token request from the client 203.

In step S521, the access token issuance unit 314 acquires an authorization request identifier from the access token request received from the client 203. In step S522, the access token issuance unit 314 determines whether an access token is issuable. In step S523, the access token issuance unit 314 checks whether it is determined that an access token is issuable as a result of step S522.

In a case where it is determined that an access token is issuable (YES in step S523), the processing proceeds to step S524. On the other hand, in a case where it is determined that an access token is not issuable (NO in step S523), the processing proceeds to step S525. In step S524, the access token issuance unit 314 issues an access token corresponding to the user identifier and the scope that are associated with the authorization request identifier acquired in step S521. Further, the issued access token is transmitted to the client 203, and the procedure ends.

Table 6 illustrates an example of an access token management table that manages access tokens issued by the access token issuance unit 314.

TABLE 6

Access Token Management Table

| Access Token Identifier | User Identifier | Scope |
|---|---|---|
| actk111222333 | user_abcde | get-data |

In Table 6, an access token indicating delegation of the authority for the scope "get-data" from the user "user_abcde" is issued as the access token identifier "actk111222333". The access token to be returned to the client 203 in step S524 can be only an access token identifier or can be structured data including a user identifier and a scope in addition to an access token identifier. In step S525, the access token issuance unit 314 notifies the client 203 that an access token is not issuable, and the procedure ends.

FIG. 5D is a detailed procedure of step S522 of determining whether an access token is issuable according to the first exemplary embodiment. In step S531, the access token issuance unit 314 refers to the authorization check status management table of Table 4 and checks an authorization result corresponding to the designated authorization request identifier. In step S532, the access token issuance unit 314 determines whether the authorization result checked in step S531 indicates approval. In a case where the authorization result indicates approval (YES in step S532), the processing proceeds to step S533. Otherwise (NO in step S532), the processing proceeds to step S534. In step S533, the access token issuance unit 314 determines that an access token is issuable, and the procedure ends. In step S534, the access token issuance unit 314 determines that an access token is not issuable, and the procedure ends.

Figure 6:
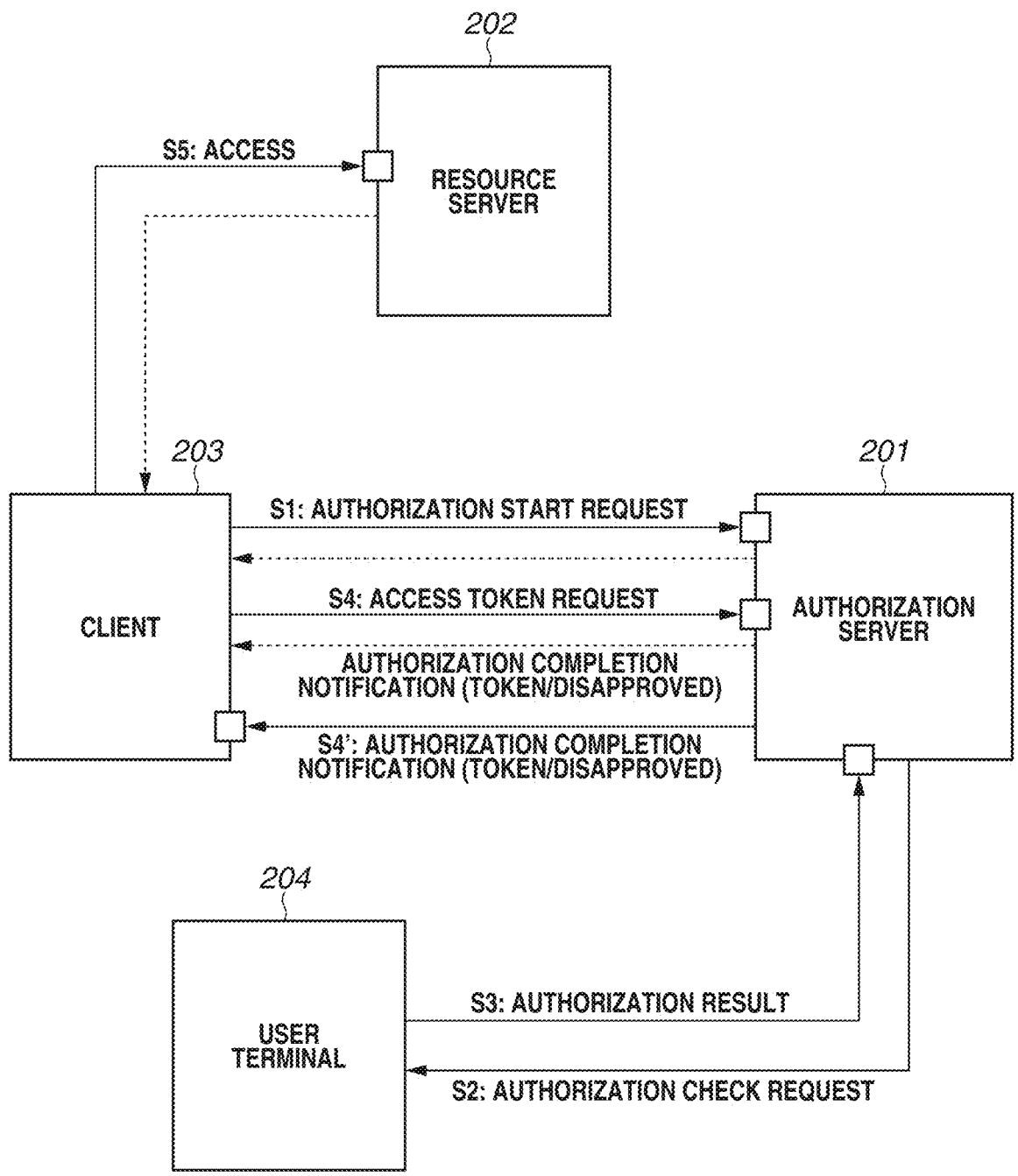
FIG. 6 is a sequence diagram illustrating the authority delegation system.

FIG. 6 is a sequence diagram illustrating an authority delegation system. In step S1, the client 203 transmits an authorization start request to the authorization server 201 and acquires an authorization request identifier as a response. The authorization start request corresponds to steps S401 and S411.

In step S2, the authorization server 201 identifies a resource owner and transmits an authorization check request to the user terminal 204 associated with the resource owner. The authorization check screen as illustrated in FIG. 9B described below is displayed on the user terminal 204, and the user of the terminal performs an authorization operation. In step S3, after the user performs an authorization operation, the user terminal 204 transmits an authorization result to the authorization server 201. Step S2 corresponds to step S424, and step S3 corresponds to step S425.

After the authorization server 201 receives the authorization result, the client 203 is to be notified of the completion of the authorization and of details of the authorization, and examples of methods for an authorization completion notification include a method in which the client 203 checks the authorization server 201 and a method in which the authorization server 201 transmits a notification to the client 203. In the former method, in step S4, the client 203 periodically transmits an access token request to the authorization server 201, and the authorization server 201 returns an authorization result as a response.

In this process, in a case where the authorization result "approved" is returned in step S3, the authorization server 201 issues an access token to the resource server 202 and returns the issued access token, whereas in a case where the authorization result "disapproved" is returned in step S3, a result indicating the disapproval is returned. Since the client 203 periodically transmits a request in step S4, there may be a case where returning of an authorization result in step S3 have not been performed. In this case, a result indicating continuation of the checking is returned. In the latter method, in step S4', the authorization server 201 transmits an authorization result notification to the client 203.

The latter case is a method that can be used in a case where the client 203 has an endpoint to receive an authorization completion notification. Details of the authorization result are similar to those in the former case, and in a case where the authorization result indicates approval, an access token is issued and the issued access token is transmitted, whereas in a case where the authorization result indicates disapproval, a resulting indicating the disapproval is returned. Step S4 corresponds to steps S512 and S521, and step S4' corresponds to step S503. In step S5, the client 203 accesses the resource server 202 using the access token received in step S4 or S4'.

As described above, the user being physically distant from the client 203 and/or being remote from the system can delegate authority to the client 203. However, there arises an issue that the user performing authorization cannot perform re-authorization due to a situation where the user is physically distant and/or is remote from the system. This issue occurs because the user terminal 204 and the client 203 are not closely linked together and the link is loose, and consequently, the user operating the user terminal 204 neither can operate the client 203 nor can transmit a re-authorization request from the user terminal 204 to the client 203.

However, there can be a case that the user desires to correct an authorization operation after operating the authorization operation. Further, since the user terminal 204, especially a small terminal including a smartphone, has a small information display area and a small operation panel, the possibilities of recognition errors and operation errors by the user are high. Thus, there is a need for performing an authorization operation again.

Figure 7:
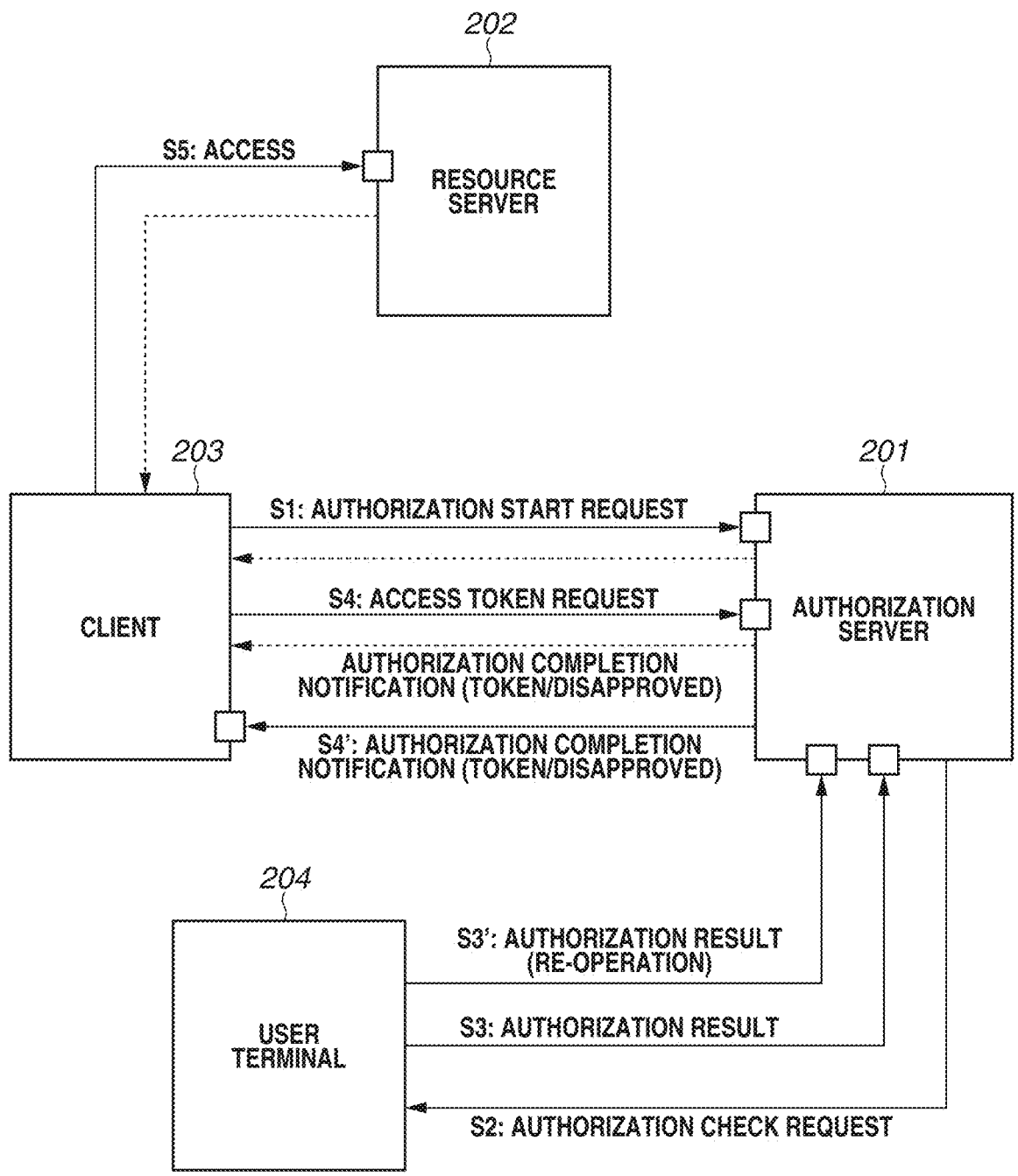
FIG. 7 is a sequence diagram illustrating a re-authorization process in the authority delegation system.

FIG. 7 is a sequence diagram illustrating a re-authorization process in authority delegation system. Steps up to step S3 of transmitting an authorization result from the user terminal 204 to the authorization server 201 are similar to those in FIG. 6. In a case where the user desires to correct the authorization result, the user performs a re-authorization operation on a re-authorization check screen as illustrated in FIG. 9D. In step S3', in a case where the user performs a re-authorization operation, the user terminal 204 transmits a re-authorization result to the authorization server 201. Details of the re-authorization result are similar to the authorization result. While the authorization server 201 has another endpoint for receiving a re-authorization result (step S3') different from the endpoint for receiving an authorization result (step S3) in FIG. 6, a common endpoint can be used for both.

A sequence diagram illustrated in FIG. 7 shows the procedure. In this procedure, there can be a case where cancelling a process of the client 203 using an access token is difficult after the performance. Thus, the authorization server 201 may wait to transmit an authorization completion notification to the client 203.

Table 7 illustrates the authorization check status management table of Table 4 that is stored in the authorization request management unit 311 and further includes authorization deadline.

TABLE 7

Re-Authorizable Authorization Check Status Management Table

| Authorization Request Identifier | Client Identifier | Resource | Scope | Hint Information | Authorization Result | Authorization Deadline |
|---|---|---|---|---|---|---|
| auth_req_id_12345 | Client_1 | /datalake/iot0010/data | get-data | user_A | disapproved | 2019 Oct. 8 10:32:48 |
| auth_req_id_98765 | Client_1 | /datalake/iot0011/data | get-data | user_B | approved | 2019 Oct. 8 10:27:53 |
| auth_req_id_44444 | Client_2 | /datalake/iot0011/data | get-all | user_abcde | (blank) | (blank) |

In the first row of Table 7, the authorization result "disapproved" is stored, which indicates user's disapproval in the authorization operation, and there is also information specifying the authorization deadline, Oct. 8, 2019, 10:32:48, until which re-authorization is allowed. In a case where a re-authorization instruction is received from the user before the authorization deadline, the authorization result is updated. Specifically, the authorization result that is a result of the authorization operation by the user is buffered until the authorization deadline. More specifically, a process based on the buffered authorization result is not performed. Even in a case where the user has given authorization, an access token is not issued as long as the result is buffered.

In the third row in Table 7, an authorization result has not been received, and an authorization deadline has also not been set. This is because the authorization deadline is set considering a re-authorization wait time, and the re-authorization deadline is calculated after the authorization result is received and then the calculated re-authorization deadline is set. The authorization deadline can be set before the authorization result is received, e.g., at the timing of receiving of the authorization request. Intervals of the authorization deadline can be set based on a value set in advance to the authorization request management unit 311 of the authorization server 201 or can be received from the client 203 at the time of the authorization start request. Further, the authorization deadline is transmitted to the user terminal 204 using transmission of the authorization result (step S3) and is also used on the authorization check screen of the user terminal 204.

Figure 8A:
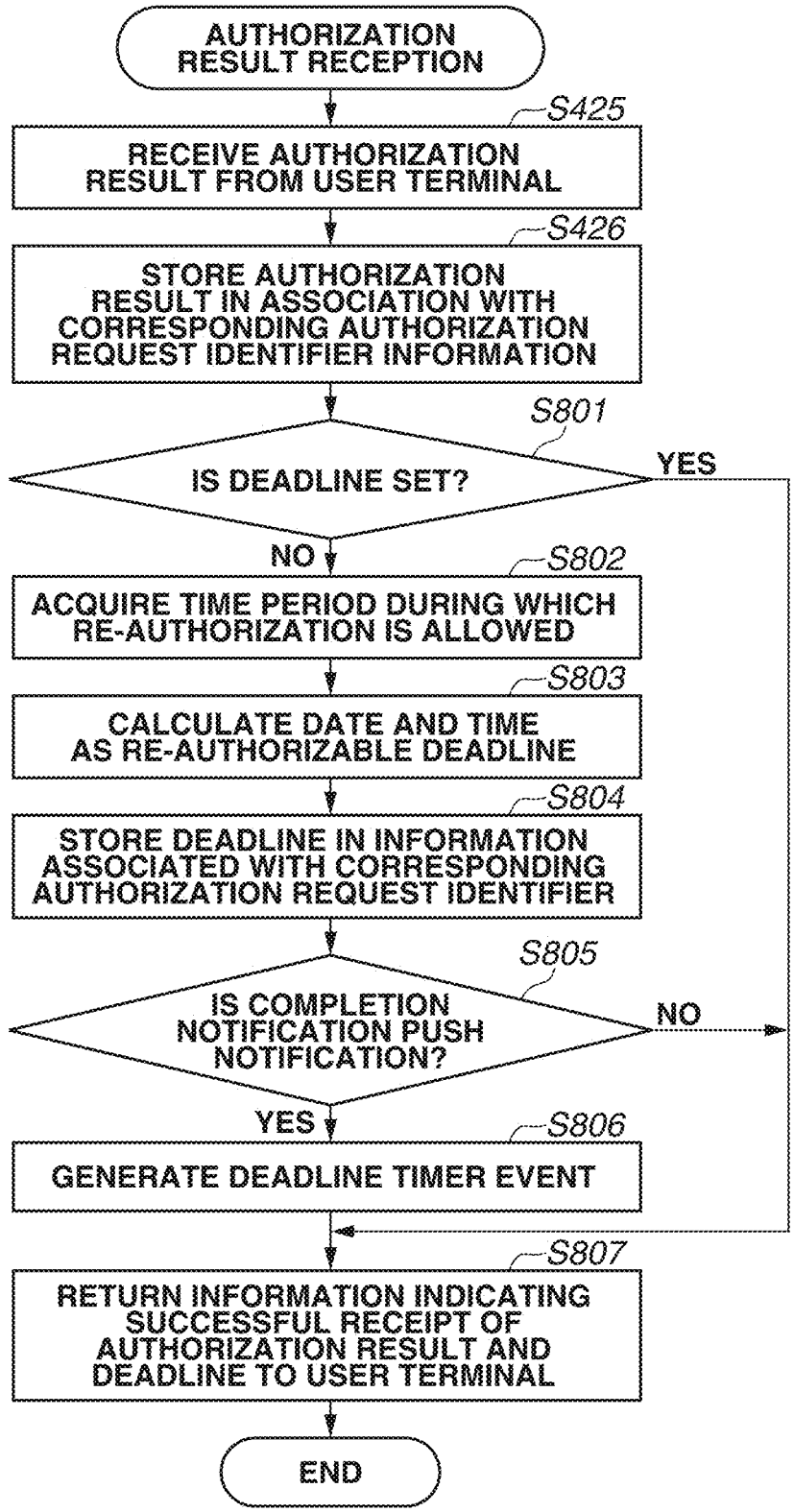
FIG. 8A is a flowchart illustrating a procedure relating to the re-authorization process.

FIGS. 8A and 8B are flowcharts relating to a re-authorization process. The flowcharts in FIGS. 8A and 8B are performed by the authorization check unit 313 and the access token issuance unit 314 of the authorization server 201. FIG. 8A is a flowchart illustrating the receiving of the authorization result (step S3) and the receiving of the re-authorization result (step S3') in FIG. 7 and illustrates a procedure from the receiving of the authorization result (step S425) in FIG. 4C.

In step S426, in a case where the authorization check unit 313 of the authorization server 201 receives an authorization result, the authorization check unit 313 stores the authorization result in information associated with the corresponding authorization request identifier. Then, in step S801, the authorization check unit 313 checks whether an authorization deadline is set for the information associated with the corresponding authorization request identifier. In a case where an authorization deadline is not set (NO in step S801), the processing proceeds to step S802. In step S802, a time period during which re-authorization is allowed is acquired. The time period during which re-authorization is allowed can be determined based on a value set in advance to the authorization request management unit 311 of the authorization server 201 or can be received from the client 203 at the time of the authorization start request. Then, in step S803, a date and time as a re-authorizable deadline is calculated from a current date and time, and in step S804, the deadline is set in the information associated with the corresponding authorization request identifier. For example, in a case where the value acquired in step S802 is three minutes and the current date and time is Oct. 8, 2019, 10:29:48, the deadline is Oct. 8, 2019, 10:32:48. Specifically, the authorization result is buffered until Oct. 8, 2019, 10:32:48. In a case where re-authorization is not allowed, the current date and time is set as the deadline.

Next, in step S805, the authorization check unit 313 of the authorization server 201 checks whether the completion notification is a push notification from the authorization server 201 to the client 203 as in step S4' in FIG. 7. In a case where the completion notification is a push notification (YES in step S805), the processing proceeds to step S806. In step S806, a deadline timer event is generated. The deadline timer event issues an event on the date and time of the deadline and is generated to transmit the authorization completion notification in step S4' in FIG. 7 from the authorization server 201 at the deadline. Then, in step S807, the authorization server 201 returns information indicating the successful receipt of the authorization result and the authorization deadline to the user terminal 204. On the other hand, in a case where an authorization deadline is set (YES in step S801) or in a case where the completion notification is not a push notification (NO in step S805), the processing proceeds to step S807.

FIG. 8B is a flowchart illustrating an access token response from the authorization server 201 in a case where the access token request (step S4) in FIG. 7 is received. A procedure from the acquiring of information about the authorization request identifier corresponding to the access token request illustrated in FIG. 5C (step S521) is illustrated. In a case where the information associated with the corresponding authorization request identifier is acquired, in step S811, whether an authorization result is set is checked. In a case where an authorization result is not set (NO in step S811), the processing proceeds to step S812. In step S812, a notification that an authorization result is not received is transmitted to the client 203.

On the other hand, in a case where an authorization result is set (YES in step S811), the processing proceeds to step S813. In step S813, whether the re-authorization deadline has passed is checked. In a case where the deadline has not passed (NO in step S813), the processing proceeds to step S812. In step S812, a notification that an authorization result is not received is transmitted, and a re-authorization check from the user is waited. On the other hand, in a case where the deadline has passed (YES in step S813), the processing proceeds to step S531. In step S531, the authorization result is checked as illustrated in FIG. 5D. In step S532, in a case where the authorization result indicates successful approval (YES in step S532), the processing proceeds to step S524. In step S524, an access token is issued and the issued access token is returned. On the other hand, in a case where the authorization result indicates disapproval (NO in step S532), the processing proceeds to step S525. In step S525, a notification of the disapproval is transmitted. As to a method for returning an authorization completion notification from the authorization server 201 to the client 203 in step S4' in FIG. 7, an authorization completion notification process is initiated by the event described in step S806 in FIG. 8A.

Figure 9A:
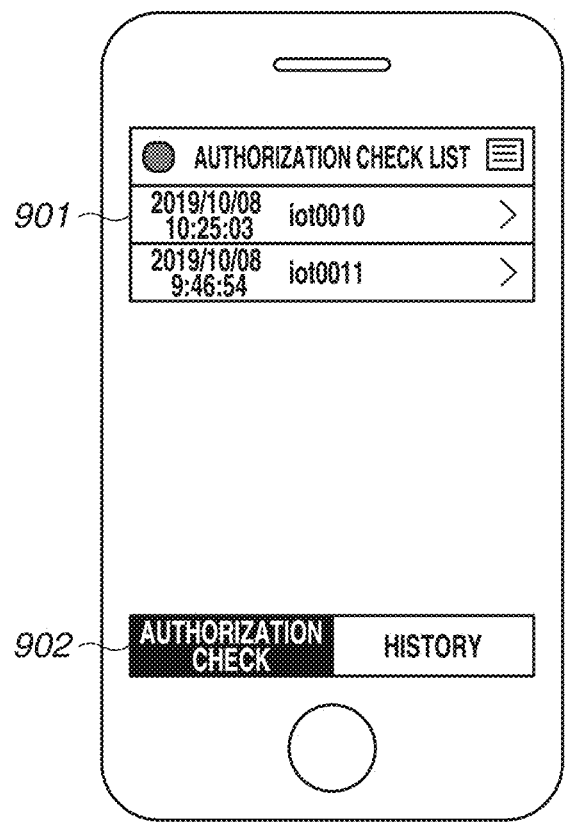
FIG. 9A is a diagram illustrating an authorization check screen.
Figure 9B:
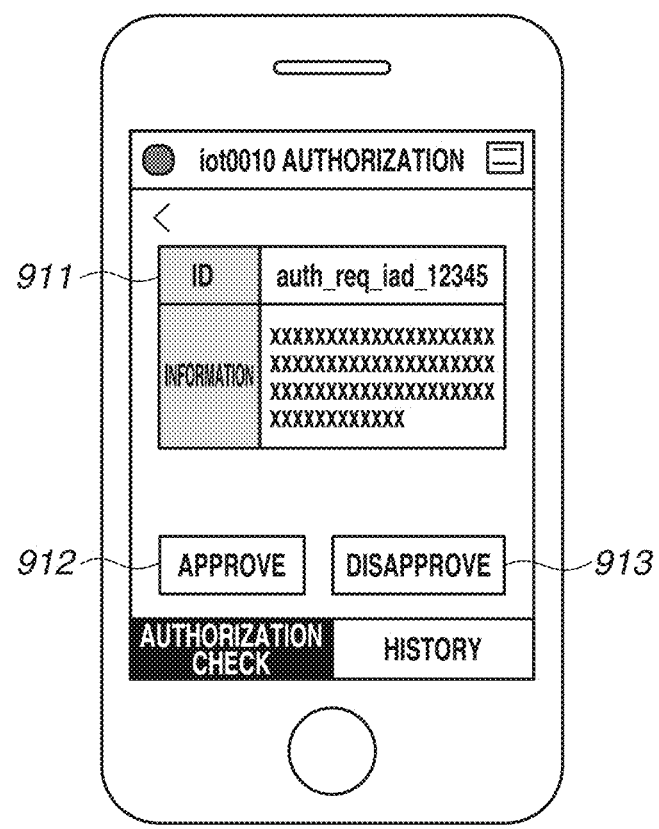
FIG. 9B is a diagram illustrating the authorization check screen.
Figure 9C:
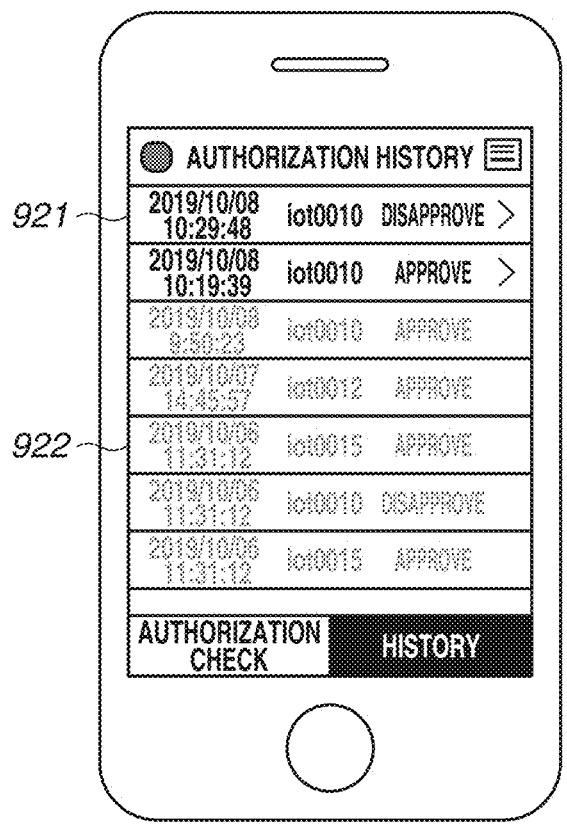
FIG. 9C is a diagram illustrating the authorization check screen.
Figure 9D:
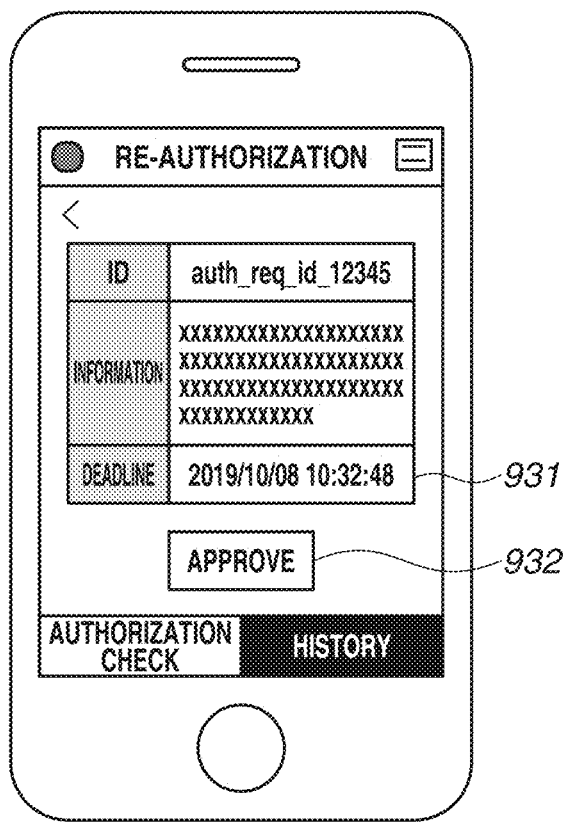
FIG. 9D is a diagram illustrating a re-authorization check screen.

FIGS. 9A to 9D illustrate screens for authorization checks using the user terminal 204. FIG. 9A illustrates an authorization check list screen. FIG. 9B illustrates the authorization check screen. FIG. 9C illustrates the authorization history screen. FIG. 9D illustrates the re-authorization check screen. Software for authorization checks is installed on the user terminal 204, and in a case where a screen of the software is activated, the authorization check list screen in FIG. 9A is displayed.

FIG. 9A illustrates the authorization check list screen and displays a list of authorization check items received by the authorization check request in step S2 in FIG. 7. An authorization check item 901 is one of authorization check items and displays a receipt date and time and information identifying an authorization target, such as resource information. As to the resource information, the resource information illustrated in Table 7 can be directly displayed entirely or partially, or the user can set a name for each resource and the resource can be displayed with the set name. The mark ">" at the right of the authorization check item 901 is a link to the authorization check screen illustrated in FIG. 9B. A tab 902 for switching between the authorization check list screen and the authorization history screen in FIG. 9C, and a selected tab is highlighted.

FIG. 9B illustrates the authorization check screen, and authorization checks are performed on the screen. An ID 911 indicates the authorization request identifier and uniquely identifies an authorization target. An information in a field under the ID 911 will not be described in detail, but the information in the field may be a display by which the user receives additional information for identifying the authorization request from the client 203 or the authorization server 201. A button 912 is an approve button for issuing an instruction to approve an authorization check, whereas a button 913 is a disapprove button for issuing an instruction to disapprove the authorization. In a case where the user performs an authorization operation by pressing the button 912 or the disapprove button 913, the authorization result transmission unit 342 transmits an authorization result as illustrated in step S3 in FIG. 7.

FIG. 9C illustrates the authorization history screen displaying a previous authorization history list for reference. In a case where an authorization check is performed in FIG. 9B, the authorization check is stored as a history in the authorization history management unit 343. This makes it possible to refer to the previous authorization histories. An authorization history 921 is one of the authorization histories and displays authorization check date and time, information identifying an authorization target, such as a resource, and an authorization result. The mark ">" at the right of the authorization history 921 is a link to the re-authorization check screen illustrated in FIG. 9D. An authorization history 922 is another one of the authorization histories, and displayed bibliographic information on the authorization history 922 is similar to that of the authorization history 921 but is displayed in gray, and the link to the re-authorization check screen is not displayed. This indicates a state in which a re-authorization operation cannot be performed because the authorization deadline of the target authorization check item has passed. A filtering function can be implemented to display a list including target resources on the authorization history screen.

FIG. 9D illustrates the re-authorization check screen. Displayed information is similar to that on the authorization check screen in FIG. 9B, except that a re-authorization deadline 931 is displayed. A button 932 is a button for use in an authorization operation. Since an operation performed in a last authorization check is a disapproving operation, an approve button for cancelling the last operation is displayed in the re-authorization. On the other hand, in a case where an operation performed in a last authorization check is an approving operation, the button 932 for use in the authorization operation is displayed as a disapprove button. Both the approve button and the disapprove button can be displayed on the re-authorization check screen as in FIG. 9B.

In a case where a re-authorization check is performed on the re-authorization check screen, the authorization result transmission unit 342 transmits an authorization result as illustrated in step S3' in FIG. 7. In the re-authorization check, the user can perform a re-authorization operation as many times as desired before the deadline, or the number of times of a re-authorization operation can be limited. For example, the number of times can be included in the authorization start request transmitted from the client 203 to designate the number of times in the request from the client 203. Furthermore, a limit that re-authorization becomes not performable in a case where either an approving operation or a disapproving operation is performed can be placed.

Figure 10A:
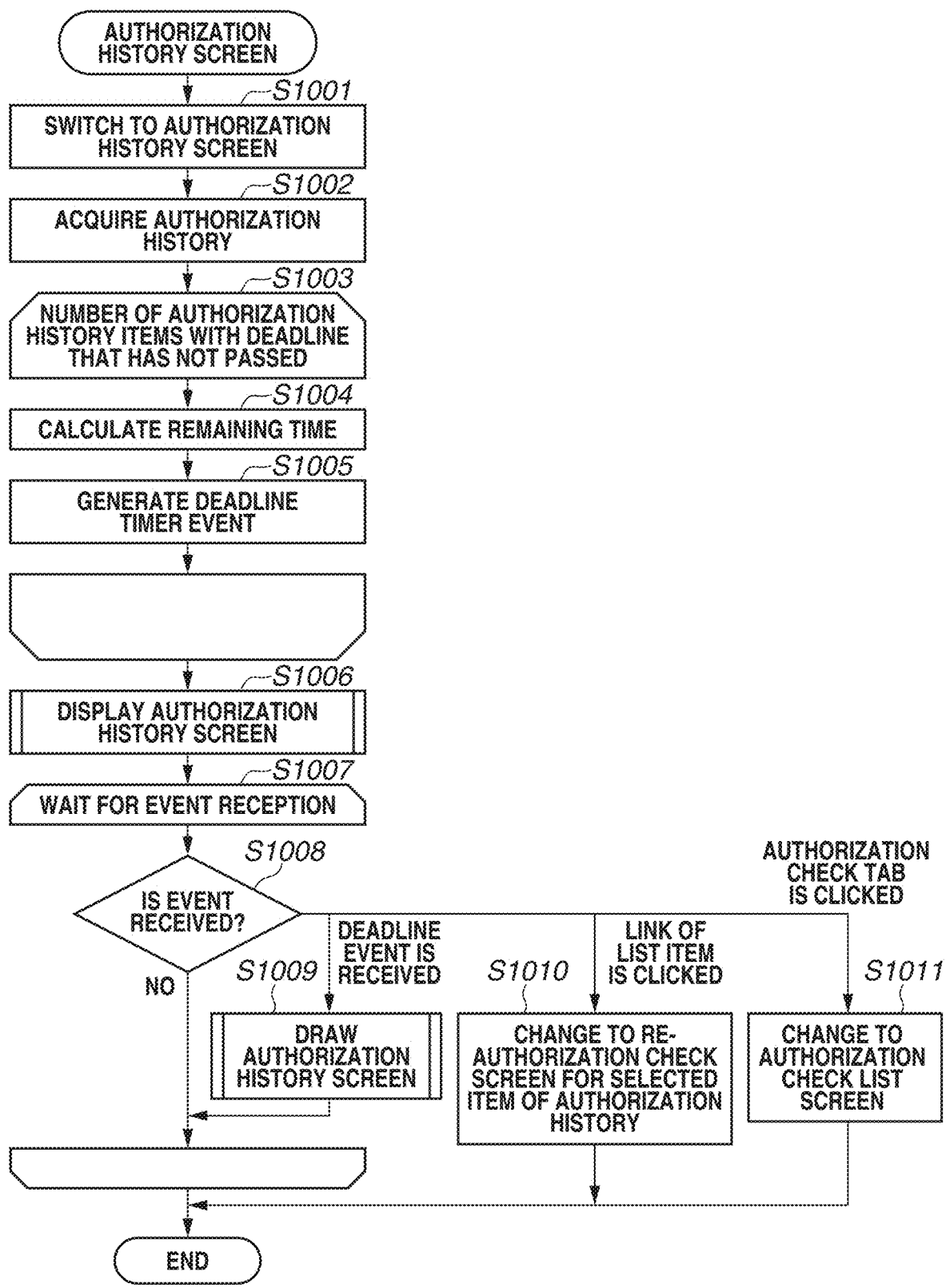
FIG. 10A is a flowchart illustrating a procedure relating to an authorization history screen.

FIG. 10A is a flowchart relating to the authorization history screen illustrated in FIG. 9C. The flowchart is performed by the user terminal 204. The authorization check list screen in FIG. 9A is displayed in response to activation of the screen of the software, and in step S1001, the authorization check list screen is switched to the authorization history screen in FIG. 9C using the tab 902 for switching to initiate the process.

First, in step S1002, the screen display unit 344 acquires an authorization history from the authorization history management unit 343. Then, in steps S1003 and S1004, a remaining time of each item of the acquired authorization history with the deadline that has not passed, i.e., each item of the authorization history for which a re-authorization operation is allowed, is calculated by subtracting the current date and time from the date and time of the deadline. Then, in step S1005, a timer event to be activated in a case where the deadline expires is generated. Next, in step S1006, the screen display unit 344 displays the authorization history screen illustrated in FIG. 9C on the display 114 of the user terminal 204.

As illustrated in FIG. 9C, the link to the re-authorization check screen in FIG. 9D is displayed with respect to an authorization history for which a re-authorization operation is allowed, whereas the link is not displayed with respect to an authorization history that has passed the authorization deadline on the authorization history screen. Thereafter, in step S1007, a screen operation or the deadline event generated in step S1005 is waited. In step S1008, in a case where an event is received, a process corresponding to the received event is performed. In a case where the deadline event is received (DEADLINE EVENT IS RECEIVED in step S1008), the processing proceeds to step S1009. In step S1009, the authorization history screen is drawn, and the display contents are updated. As a result of the screen updating, the link to the re-authorization check screen is removed from the authorization history having reached the deadline on the screen display. In a case where an event of a click on a link of a list item of the authorization history 921 in FIG. 9C is received (LINK OF LIST ITEM IS CLICKED in step S1008), the processing proceeds to step S1010. In step S1010, the screen is changed to the re-authorization check screen for the selected item of the authorization history. In a case where an event of a click on the authorization check tab in the tab 902 in FIG. 9A is received (AUTHORIZATION CHECK TAB IS CLICKED in step S1008), the processing proceeds to step S1011. In step S1011, the screen is changed to the authorization check list screen.

FIG. 10B is a sub-flowchart illustrating the drawing of authorization histories in FIG. 10A. In step S1021, details of each item of the authorization history are checked, and in step S1022, determination of whether the deadline of each item has passed is performed. In a case where the deadline is not passed (NO in step S1022), the processing proceeds to step S1023. In step S1023, a list item including a link to the re-authorization screen is displayed. On the other hand, in a case where the deadline has passed (YES in step S1022), the processing proceeds to step S1024. In step S1024, a list item without a link to the re-authorization screen is displayed.

As described above, according to the first exemplary embodiment, the user is allowed to perform an operation of an authorization check again in a case where the user desires to correct an authorization operation or in a case where a recognition error or an operation error occurs.

According to the first exemplary embodiment, wait processing is performed by the authorization server 201 for a time period during which an authorization check is allowed to be performed again. However, whether to allow re-authorization and whether to allow a response delay due to the wait processing are considered to relate to details of the processing that the client 203 performs on the resource server 202. For example, in a case where an authorization procedure using a terminal is performed to pay for an item in face-to-face purchasing, the wait processing does not have to be performed. Thus, there can be cases in which performing the wait processing by the authorization server 201 is inconvenient for the client 203.

In the above-described cases, it is necessary to employ a configuration for including an instruction specifying whether to allow re-authorization and an instruction specifying the length of a response deadline in the authorization start request (step S401) performed by the client 203. A sequence of re-authorization processing in the authority delegation system according to a second exemplary embodiment is similar to that in the first exemplary embodiment, and configurations and processing without descriptions are similar to those in the first exemplary embodiment.

FIG. 11 illustrates information that is transmitted by the authorization start request. The information "scope" indicates a scope of authority that is used in the processing that the client 203 performs on the resource server 202, and the information "hint" indicates hint information. The information "retry" indicates whether re-authorization is allowed. True indicates allowing of re-authorization, whereas false indicates not allowing of re-authorization. While the values indicating that re-authorization is allowed or not allowed are specified according to the second exemplary embodiment, the number of times of re-authorization can be designated. The information "expires_in" indicates an authorization deadline, and when "expires_in"=1800, authorization needs to be performed within 1800 seconds. While the above-described four items are illustrated in FIG. 11, the information is not limited to those described above. For example, in a case where an authorization completion notification is transmitted in step S4' in FIG. 7, endpoint information about the client 203 is to be included, or a message character string to be displayed on the user terminal 204 can be included.

Table 8 is a table further including, in addition to the authorization check status management table illustrated in Table 7 that is stored in the authorization request management unit 311, areas for storing instructions to determine whether re-authorization is allowed and instructions for indicating response deadlines that are transmitted from the client 203. The client identifier, the resource, and the scope illustrated in Table 7 are omitted.

a case where an authorization completion notification is transmitted as a response to the access token request in step S4 in FIG. 7, the authorization deadline is to be set considering an interval of polling from the client 203. An interval to the next polling can be designated in responses to the authorization start request in step S1 and the access token request in step S4, or the interval can be set slightly shorter considering processing overhead. Even in a case where a response is transmitted from the authorization server 201 to the client 203 as in step S4', the interval can be set slightly shorter considering processing overhead.

In the second row of Table 8, the re-authorization is "false", which means that the request does not allow re-authorization. Further, the response deadline is "300", which means that this instruction allows waiting 300 seconds for the authorization completion notification from the authorization server 201. Specifically, the authorization deadline is not a deadline for re-authorization but a deadline for first authorization. For example, in a case where the authorization procedure using a terminal is performed to pay for an item in face-to-face purchasing, the wait processing does not have to be performed, and a response is promptly returned, and thus the response deadline is set short. In a case where the authorization server 201 receives an authorization request, the authorization server 201 sets a date and time obtained by adding a response deadline to a current date and time as an authorization deadline. Since re-authorization is not allowed, in a case where the authorization server 201 receives an authorization result from the user terminal 204 in step S3 in FIG. 7, the date and time of the receipt is set as the authorization deadline. The authorization check result is buffered for the time period during which re-authorization is allowed, and access token issue control is not performed immediately.

In the third row of Table 8, the re-authorization is "false", which means that the instruction does not allow re-authorization. Further, a response deadline is not designated. In this case, the authorization server 201 does not set an authorization deadline in a case where an authorization request is received, and in a case where the authorization result is received from the user terminal 204 in step S3 in FIG. 7, the date and time of the receipt can be set as the authorization deadline. The buffering for re-authorization is not performed, and this is a feature of the case of the third row.

TABLE 8

Authorization Check Status Management Table Designating Instructions Relating To Re-Authorization

| Authorization Request Identifier | Hint ... Information | Re- Authorization | Deadline (Sec) | Authorization Result | Authorization Deadline |
|---|---|---|---|---|---|
| auth_req_id_12345 | ... user_A | true | 1800 | disapproved | 2019 Oct. 8 10:32:48 |
| auth_req_id_98765 | ... user_B | false | 300 | (blank) | 2019 Oct. 8 10:27:53 |
| auth_req_id_67890 | ... user_C | false | (blank) | (blank) | (blank) |
| auth_req_id_44444 | ... user_abcde | true | (blank) | approved | (blank) |

In the first row of Table 8, the re-authorization is "true", which means that the request allows re-authorization. Further, the response deadline is "1800", which means that this instruction allows waiting 1800 seconds for the authorization completion notification from the authorization server 201. In a case where the authorization server 201 receives an authorization request, the authorization server 201 sets a date and time obtained by adding a response deadline to a current date and time as an authorization deadline. Here, in While the second and third rows of Table 8 are different in that the buffering is performed or not performed, the user is not allowed to perform re-authorization in both cases.

In the fourth row of Table 8, the re-authorization is "true", and a deadline is not set, which means that the instruction allows re-authorization and a deadlines is not set. Although this type of use case may be a rare case, there can be a case where the processing that the client 203 performs on the resource server 202 can be performed as many times as desired and no particular deadlines are set. In this case, the authorization server 201 does not set an authorization deadline in a case where an authorization request is received, and even in a case where an authorization result is received from the user terminal 204 in step S3 in FIG. 7, the authorization server 201 does not set an authorization deadline.

Figure 12:
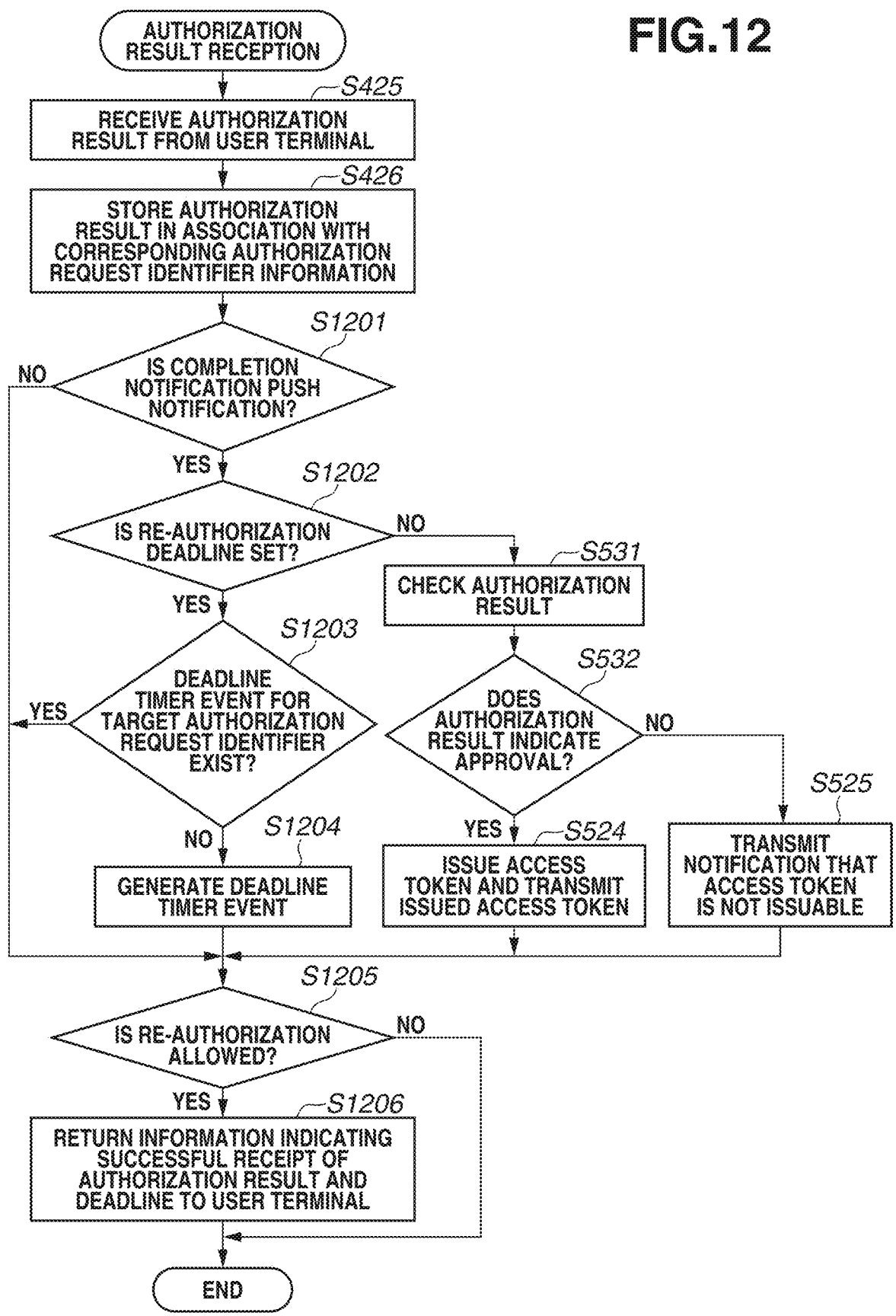
FIG. 12 is a flowchart illustrating a procedure of receiving an authorization result according to the second exemplary embodiment.

FIG. 12 is a flowchart illustrating a processing procedure of receiving an authorization result according to the second exemplary embodiment. The flowchart in FIG. 12 is performed by the authorization check unit 313 and the access token issuance unit 314 of the authorization server 201. FIG. 12 illustrates the procedure for the receiving of the authorization result (step S3) and the receiving of the re-authorization result (step S3') in FIG. 7 and the procedure from the receiving of the authorization result (step S425) in FIG. 4C.

In a case where the authorization check unit 313 of the authorization server 201 receives an authorization result, in step S426, the authorization check unit 313 stores the authorization result in information associated with the corresponding authorization request identifier. In step S1201, the authorization check unit 313 of the authorization server 201 checks whether the completion notification is a push notification from the authorization server 201 to the client 203 in step S4' in FIG. 7, and in a case where the completion notification is a push notification (YES in step S1201), the processing proceeds to step S1202. In step S1202, whether a re-authorization deadline is set is checked. In the first exemplary embodiment, a re-authorization deadline is set in the above-described procedure. In the second exemplary embodiment, a description will be given of a case where a re-authorization deadline is not set. In a case where a re-authorization deadline is set (YES in step S1202), the processing proceeds to step S1203. In step S1203, whether there is a deadline timer event for a completion notification of the authorization request identifier as a target is checked. In a case where there is not a deadline timer event (NO in step S1203), the processing proceeds to step S1204. In step S1204, a deadline timer event is generated. In a case where the completion notification is a push notification (YES in step S1201) and no re-authorization deadlines are set (NO in step S1202), an authorization completion notification is immediately transmitted.

In step S531, the access token issuance unit 314 of the authorization server 201 checks the authorization result. In step S532, in a case where the authorization result indicates an approval (YES in step S532), the processing proceeds to step S524. In step S524, an access token is issued and the issued access token is returned. On the other hand, in a case where the authorization result indicates a disapproval (NO in step S532), the processing proceeds to step S525. In step S525, a notification of the disapproval is transmitted. Instead of immediately transmitting an authorization completion notification, an event or a queue for transmitting an authorization completion notification may be generated to perform authorization completion notification as a separate process.

Then, in step S1205, the authorization check unit 313 of the authorization server 201 refers to the values in the re-authorization column in Table 8 and checks whether re-authorization of the authorization of the target authorization request identifier is allowed. In a case where re-authorization of the authorization of the target authorization request identifier is allowed (YES in step S1205), the processing proceeds to step S1206. In step S1206, information indicating the receipt of the authorization result and the authorization deadline are returned to the user terminal 204. Information indicating whether the re-authorization is allowed, which is in the re-authorization column in Table 8, can also be returned to the user terminal 204 in step S1206. In a case where a timer event is generated in step S1204, the authorization completion notification process is initiated in response to activation of the timer event. On the other hand, in a case where the completion notification is not a push notification (NO in step S1201) or in a case where there is a deadline timer event (YES in step S1203), the processing proceeds to step S1205. In a case where re-authorization of the authorization of the target authorization request identifier is not allowed (NO in step S1205), the processing of this flowchart is end.

Figure 13:
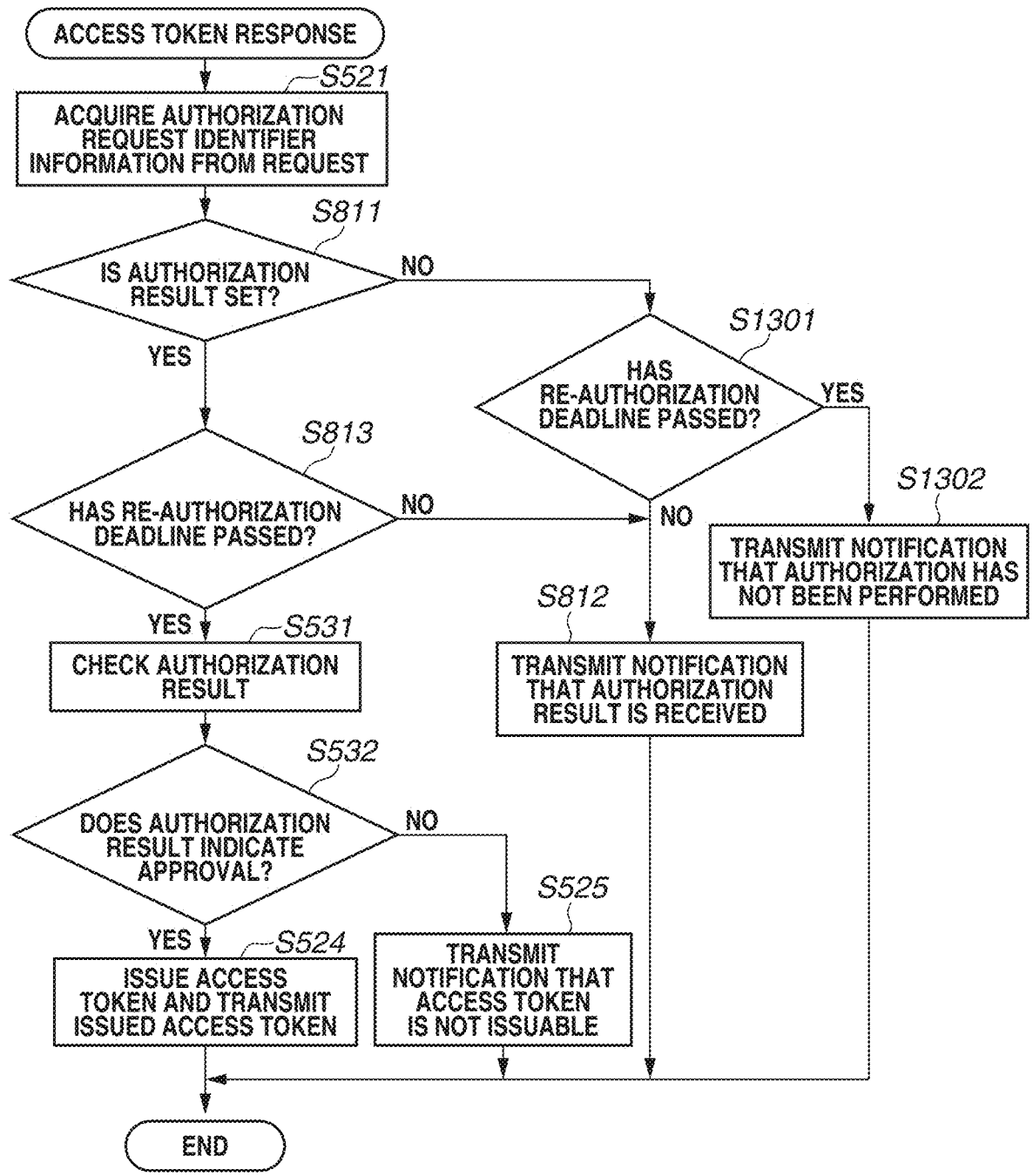
FIG. 13 is a flowchart illustrating a procedure of an access token response according to the second exemplary embodiment.

FIG. 13 is a flowchart illustrating a processing procedure of an access token response from the authorization server 201 in a case where the access token request (step S4) in FIG. 7 is received. The flowchart in FIG. 13 is performed by the access token issuance unit 314 of the authorization server 201. The flowchart in FIG. 13 illustrates the procedure from the acquiring of information about the authorization request identifier corresponding to the access token request illustrated in FIG. 5C (step S521).

In a case where information associated with the corresponding authorization request identifier is acquired, in step S811, whether an authorization result is set is checked. In a case where an authorization result is not set (NO in step S811), the processing proceeds to step S1301. In step S1301, whether the re-authorization deadline has passed is checked. In a case where the re-authorization deadline has not passed (NO in step S1301), the processing proceeds to step S812. In step S812, a notification that an authorization result is not received is transmitted to the client 203. On the other hand, in a case where the re-authorization deadline has passed (YES in step S1301), the processing proceeds to step S1302. In step S1302, a notification that the authorization has not been performed is transmitted. While, in the first exemplary embodiment, a re-authorization deadline is set in a case where authorization is performed once, in the second exemplary embodiment, a re-authorization deadline is set in a case where an authorization start request is received. Thus, there may be a case where a deadline passes without performing authorization.

On the other hand, in step S811, in a case where an authorization result is set (YES in step S811), the processing proceeds to step S813. In step S813, whether the re-authorization deadline has passed is checked. In a case where the deadline has not passed (NO in step S813), the processing proceeds to step S812. In step S812, a notification that an authorization result is not received is transmitted, and a re-authorization check by the user is waited. On the other hand, in a case where the deadline has passed (YES in step S813), the processing proceeds to step S531. In step S531, the authorization result is checked as illustrated in FIG. 5D. In step S532, in a case where the authorization result indicates approval (YES in step S532), the processing proceeds to step S524. In step S524, an access token is issued and the issued access token is returned. On the other hand, in a case where the authorization result indicates disapproval (NO in step S532), the processing proceeds to step S525. In step S525, a notification of the disapproval is transmitted.

Figure 14:
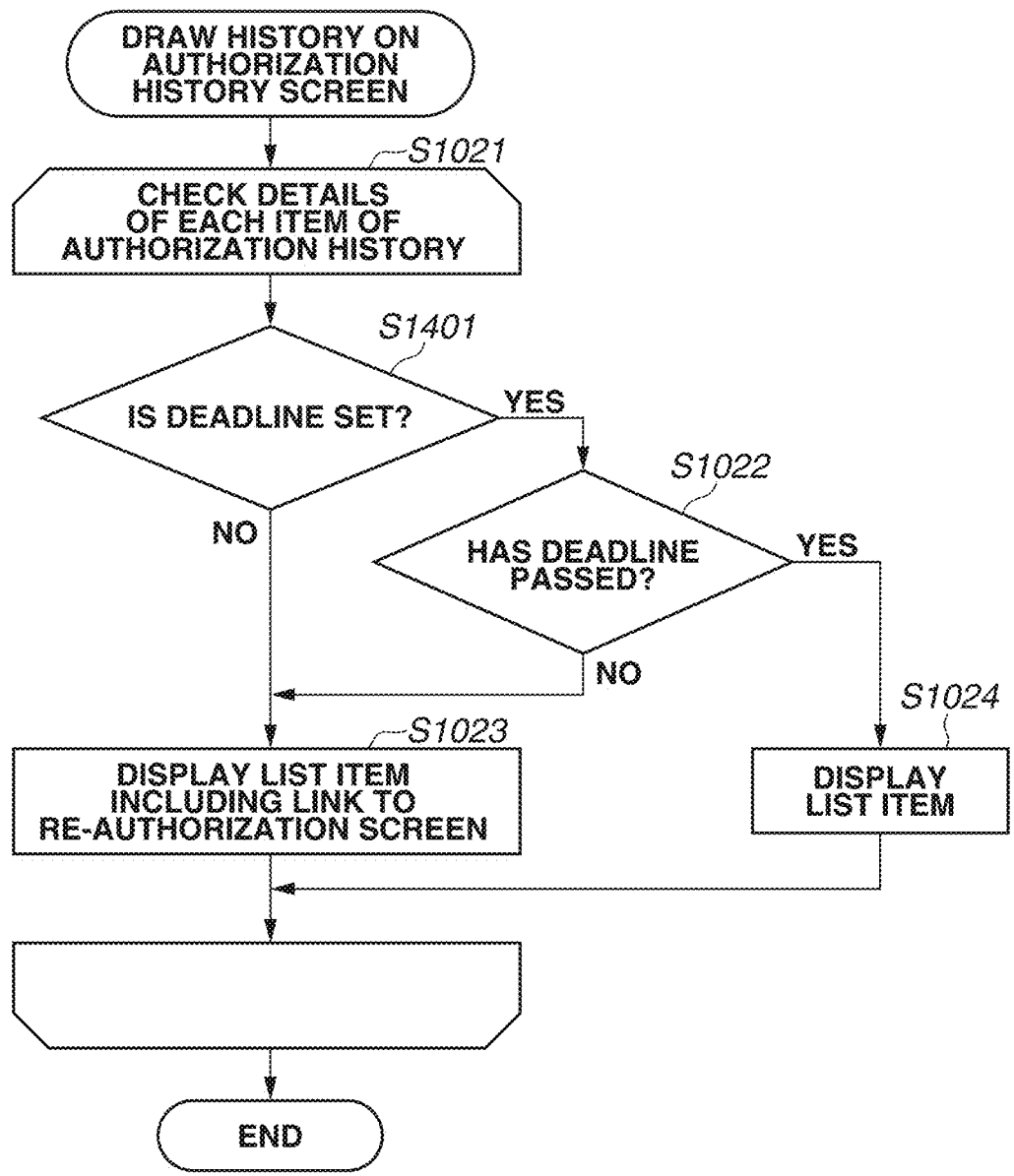
FIG. 14 is a flowchart illustrating a procedure of drawing an authorization history according to the second exemplary embodiment.

A flowchart in FIG. 14 is an application of the flowchart in FIG. 10B illustrating the procedure of the authorization history drawing process performed by the screen display unit 344 on the user terminal 204 to the procedure of an authorization process according to the second exemplary embodiment. Steps S1021 to S1024 are similar to those in FIG. 10B, and in step S1401, determination of whether a deadline is set is performed.

In the implementation example described above, in a case where re-authorization is allowed, a date and time obtained by adding the time period during which re-authorization is allowed is set as a deadline, whereas in a case where re-authorization is not allowed, a current date and time is set as a deadline as illustrated in FIG. 8A. In the re-authorization process procedure according to the second exemplary embodiment, there may be a case where a re-authorization deadline is not set. In a case where a re-authorization deadline is not set, deadline information is not transmitted from the authorization server 201, and a deadline is not set in the history information. In a case where a deadline is not set (NO in step S1401), the processing proceeds to step S1023. In step S1023, a list item including a link to the re-authorization screen is displayed. In this case, the re-authorization deadline 931 illustrated in FIG. 9D is not displayed.

According to the second exemplary embodiment, there is information for determining whether re-authorization is allowed, in the re-authorization column in Table 8. In a case where re-authorization is not allowed, the information, received in step S1206, indicating whether re-authorization is allowed may be used to display a message notifying that re-authorization is not allowed, on the screen in FIG. 9B, or display a dialog box for a check in response to pressing of the button 912 or 913.

As described above, instructions specifying whether to allow re-authorization and whether to allow a response delay due to the wait processing can be issued from the client 203. Accordingly, the wait processing is no longer necessary in a case where, for example, the authorization procedure using a terminal is performed to pay for an item in face-to-face purchasing, whereby an access token is issued promptly. Meanwhile, in a case where the user desires to correct a previously-performed authorization operation, the user can perform re-authorization.

Other Exemplary Embodiments

According to the first and second exemplary embodiments, the buffering using a dedicated storage area prepared in a RAM is described as a form of temporarily storing an authorization result. Not only the buffering but also any temporary storage methods can be used. For example, a temporary storage method in which an authorization check result is stored in a permanent storage area and thereafter erased can be used.

The present invention is also realizable by performing the following process. Specifically, software (program) for realizing the functions according to the above-described exemplary embodiments is fed to a system or an apparatus via a network or various storage mediums, and a computer (or a CPU or a micro-processing unit (MPU)) of the system or the apparatus reads the program and executes the read program.

The present invention is not limited to the above-described exemplary embodiments, and various changes and modifications can be made within the spirit and scope of the present invention. The claims below are attached to state the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A system allowing a user to perform a re-authorization operation in a form where an authorization request from a client and an authorization operation by the user are independent of each other is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An authorization server in a system including a resource server configured to provide a resource of a user, a client configured to access the resource, the authorization server configured to issue an access token indicating approval by the user for access of the client to the resource, and a user terminal, the authorization server comprising:
at least one first processor and at least one first memory coupled to the first processor and having stored thereon instructions,
when executed by the first processor, and cooperating to act as:
a reception unit configured to receive an authorization start request from the client;
an identification unit configured to identify, in a case where the authorization start request is received by the reception unit, the user terminal that is a transmission destination of an authorization check request;
an authorization unit configured to transmit the authorization check request to the identified user terminal, receive an authorization check result as a response, and temporarily store the authorization check result for a time period during which re-authorization is allowed; and
an issuance unit configured to control, in response to expiration of the time period during which re-authorization is allowed, issuance of the access token based on the authorization check result stored temporarily, and transmit, in a case where the issuance unit issues the access token, the access token to the client from which the authorization start request has been transmitted,
wherein, in a case where the authorization start request received by the reception unit is a request specifying that re-authorization is not allowed, the issuance unit controls issuance of the access token based on the authorization check result without waiting for expiration of the time period during which re-authorization is allowed.

2. The authorization server according to claim 1, wherein, in response to expiration of the time period during which re-authorization is allowed, the issuance unit checks the authorization check result stored temporarily, and in a case where the access token is not to be issued, the issuance unit transmits information indicating disapproval to the client after expiration of the time period during which re-authorization is allowed.

3. The authorization server according to claim 1, wherein, in a case where the authorization unit receives a re-authorization instruction from the client, the authorization unit updates the authorization check result stored temporarily, based on the re-authorization instruction.

4. The authorization server according to claim 1, wherein the time period is set based on a value calculated from a time and date of receipt of the authorization check result and a preset value or based on a value designated by the authorization start request transmitted from the client.

5. The authorization server according to claim 1, wherein, in a case where the authorization start request received by the reception unit is a request specifying that re-authorization is not allowed, the authorization unit does not temporarily store the received authorization check result.

6. The authorization server according to claim 1, wherein, in a case where the authorization start request received by the reception unit is a request specifying that re-authorization is allowed, information indicating receipt of an authorization result and an authorization deadline are transmitted to the user terminal.

7. A system including a resource server configured to provide a resource of a user, a client configured to access the resource, the authorization server configured to issue an access token indicating approval by the user for access of the client to the resource, and a user terminal, the system comprising:
   at least one first processor and at least one first memory coupled to the first processor and having stored thereon instructions,
   when executed by the first processor, and cooperating to act as:
   a reception unit configured to receive an authorization start request from the client;
   an identification unit configured to identify, in a case where the authorization start request is received by the reception unit, the user terminal that is a transmission destination of an authorization check request;
   a transmission unit configured to transmit the authorization check request to the identified user terminal;
   a first reception unit configured to display an authorization check item of the authorization check request and receive an approval instruction or a disapproval instruction to the authorization check request;
   an authorization unit configured to receive an authorization check result as a response to the authorization check request and temporarily store the authorization check result for a time period during which re-authorization is allowed;
   a second reception unit configured to receive a re-authorization instruction after receipt of the approval instruction or the disapproval instruction to the authorization check request; and
   an issuance unit configured to control, in response to expiration of the time period during which re-authorization is allowed, issuance of the access token based on the authorization check result stored temporarily, and transmit, in a case where the issuance unit issues the access token, the access token to the client from which the authorization start request has been transmitted,
   wherein, in a case where the authorization start request received by the reception unit is a request specifying that re-authorization is not allowed, the issuance unit controls issuance of the access token based on the authorization check result without waiting for expiration of the time period during which re-authorization is allowed.

8. The system according to claim 7, wherein the second reception unit is configured not to receive a re-authorization instruction to the authorization check request after expiration of the time period during which re-authorization is allowed.

9. A method that is performed by a system including a resource server configured to provide a resource of a user, a client configured to access the resource, the authorization server configured to issue an access token indicating approval by the user for access of the client to the resource, and a user terminal, the method comprising:
   receiving an authorization start request from the client;
   identifying, in a case where the authorization check request is received, the user terminal that is a transmission destination of an authorization check request;
   transmitting the authorization check request to the identified user terminal;
   displaying an authorization check item of the authorization check request and receiving an approval instruction or a disapproval instruction to the authorization check request;
   receiving, as first receiving, an authorization check result as a response to the authorization check request and temporarily storing the authorization check result for a time period during which re-authorization is allowed;
   receiving, as second receiving, a re-authorization instruction after receipt of the approval instruction or the disapproval instruction to the authorization check request; and
   controlling, in response to expiration of the time period during which re-authorization is allowed, issuance of the access token based on the authorization check result stored temporarily, and transmitting, in a case where the access token is issued, the access token to the client from which the authorization start request has been transmitted,
   wherein, in a case where the authorization start request is a request specifying that re-authorization is not allowed, the controlling controls issuance of the access token based on the authorization check result without waiting for expiration of the time period during which re-authorization is allowed.

* * * * *